United States Patent
Xu et al.

(10) Patent No.: US 12,545,694 B2
(45) Date of Patent: Feb. 10, 2026

(54) CANNABIDIOL DERIVATIVES, PREPARATION METHOD THEREOF AND USE THEREOF

(71) Applicant: CHENGDU BAIYU PHARMACEUTICAL CO., LTD., Sichuan (CN)

(72) Inventors: Xuezhen Xu, Chengdu (CN); Jing Zhang, Chengdu (CN); Yonggang Wei, Chengdu (CN); Hongzhu Chu, Chengdu (CN); Fuqiang Zhao, Chengdu (CN); Guizhuan Su, Chengdu (CN); Meiwei Wang, Chengdu (CN); Yi Sun, Chengdu (CN)

(73) Assignee: Chengdu Baiyu Pharmaceutical Co., Ltd., Sichuan (CN)

( * ) Notice: Subject to any disclaimer, the term of this patent is extended or adjusted under 35 U.S.C. 154(b) by 930 days.

(21) Appl. No.: 17/772,126

(22) PCT Filed: Jan. 7, 2021

(86) PCT No.: PCT/CN2021/070728
§ 371 (c)(1),
(2) Date: Apr. 26, 2022

(87) PCT Pub. No.: WO2021/139739
PCT Pub. Date: Jul. 15, 2021

(65) Prior Publication Data
US 2023/0002425 A1    Jan. 5, 2023

(30) Foreign Application Priority Data
Jan. 8, 2020  (CN) .......................... 202010016851.0

(51) Int. Cl.
C07F 9/36    (2006.01)
(52) U.S. Cl.
CPC ..................................... C07F 9/36 (2013.01)
(58) Field of Classification Search
CPC ........................................................ C07F 9/36
See application file for complete search history.

(56) References Cited

U.S. PATENT DOCUMENTS

| | | |
|---|---|---|
| 4,833,073 A | 5/1989 | McNally et al. |
| 5,227,537 A | 7/1993 | Stoss et al. |
| 6,008,383 A | 12/1999 | Elsohly et al. |
| 6,274,635 B1 | 8/2001 | Travis |
| 2003/0232101 A1 | 12/2003 | Travis |
| 2005/0020544 A1 | 1/2005 | Garzon et al. |
| 2005/0165088 A1 | 7/2005 | Whittle et al. |
| 2006/0194761 A1 | 8/2006 | Gu |
| 2007/0093665 A1 | 4/2007 | Burdick et al. |
| 2009/0143462 A1 | 6/2009 | Stinchcomb et al. |
| 2010/0298579 A1 | 11/2010 | Steup et al. |
| 2015/0258040 A1 | 9/2015 | Lynch et al. |
| 2015/0343071 A1 | 12/2015 | Vangara et al. |
| 2016/0310443 A1 | 10/2016 | Reillo et al. |
| 2017/0008868 A1 | 1/2017 | Dialer et al. |
| 2017/0044092 A1 | 2/2017 | Appendino et al. |
| 2019/0031601 A1 | 1/2019 | ElSohly et al. |
| 2020/0181051 A1 | 6/2020 | McKinney |
| 2023/0059087 A1 | 2/2023 | Zhou et al. |
| 2023/0227482 A1 | 7/2023 | Zhang et al. |

FOREIGN PATENT DOCUMENTS

| | | | |
|---|---|---|---|
| CN | 1331687 A | 1/2002 | |
| CN | 109400645 A | 3/2019 | |
| EP | 4088723 A1 | 11/2022 | |
| WO | 2004/016254 A2 | 2/2004 | |
| WO | 2008/107879 A1 | 9/2008 | |
| WO | 2016109624 A1 | 7/2016 | |
| WO | WO-2017008136 A2 * | 1/2017 | .............. A61P 25/08 |

(Continued)

OTHER PUBLICATIONS

Ronzio, R. (2017). Metabolite. In R. Ronzio, Library of Health and Living: The Encyclopedia of Nutrition and Good Health (3rd ed.). Facts On File. https://search.credoreference.com/articles/Qm9va0FydGljbGU6MTIwNTg3MQ==?aid=279753 (Year: 2017).*
Tanaka, K., et al., Current Neuropharmacology, 2013, 11, 430-435 (Year: 2013).*
FDA Drug Safety Communication: Reduced Effectiveness of Plavix (Clopidogrel) in Patients Who are Poor Metabolizers of the Drug, 2017, pp. 1-2 (Year: 2017).*
Pop et al., "Water-soluble combinations of dexanabinol: prodrugs and analogs," *Pharmazie* 55(3):167-171, Mar. 2000. (5 pages).

(Continued)

*Primary Examiner* — John S Kenyon
*Assistant Examiner* — Sara Elizabeth Bell
(74) *Attorney, Agent, or Firm* — Seed IP Law Group LLP

(57) ABSTRACT

Cannabidiol derivatives and medical use thereof, in particular to compounds represented by general formula (I), or stereoisomers, solvates, metabolites, pharmaceutically acceptable salts or cocrystals thereof, wherein the definitions of the substituents in general formula (I) are the same as those in the description.

General formula (I)

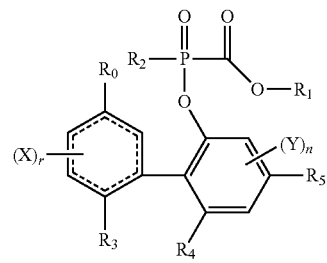

7 Claims, No Drawings

(56) References Cited

FOREIGN PATENT DOCUMENTS

| WO | 2018/096504 A1 | 5/2018 | | |
|---|---|---|---|---|
| WO | 2019089583 A1 | 5/2019 | | |
| WO | 2019104442 A1 | 6/2019 | | |
| WO | WO 2020117288 A1 | 6/2020 | | |
| WO | WO-2020263888 A1 | * 12/2020 | ........... | A61K 31/658 |
| WO | WO 2021046636 A1 | 3/2021 | | |
| WO | 2021/139740 A1 | 7/2021 | | |

OTHER PUBLICATIONS

Gläser et al., "The Diels-Alder Approach to $\Delta^9$-Tetrahydrocannabinol Derivatives," *Eur. J. Org. Chem.* 2015(7):1516-1524, Mar. 2015.

International Search Report for international application No. PCT/CN2021/070728, mailed Apr. 6, 2021, 3 pages (English translation).

International Search Report for international application No. PCT/CN2021/070729, mailed Apr. 9, 2021, 3 pages (English translation).

International Search Report for international application No. PCT/CN2021/070730, mailed Apr. 6, 2021, 3 pages (English translation).

Lago-Fernandez et al., "New Methods for the Synthesis of Cannabidiol Derivatives," Chapter Eleven, *Methods in Enzymology* 593:237-257, 2017.

Rong et al., "Review on Pharmacological Effects of Tetrahydrocannabinol and Cannabidiol," *Nat. Prod. Res. Dev.* 29:1449-1453, 2017 (with English abstract).

Sun et al., "Deuterium isotope effects in drug pharmacokinetics II: Substrate-dependence of the reaction mechanism influences outcome for cytochrome P450 cleared drugs," *PLoS ONE* 13(11):e0206279, p. 1-17, Nov. 14, 2018.

Kaur et al., "Deuteration as a Tool for Optimization of Metabolic Stability and Toxicity of Drugs," Global Journal of Pharmacy and Pharmaceutical Science, vol. 1, Issue 4, Mar. 2017 (Year: 2017).

Ujvary et al., "Human Metabolites of Cannabidiol: A Review on Their Formation, Biological Activity, and Relevance in Therapy," Cannabis and Cannabinoid Research, vol. 1.1, 2016 (Year: 2016).

* cited by examiner

CANNABIDIOL DERIVATIVES, PREPARATION METHOD THEREOF AND USE THEREOF

TECHNICAL FIELD

The present application relates to cannabidiol derivatives, or stereoisomers, solvates, prodrugs, metabolites, pharmaceutically acceptable salts or cocrystals thereof, and pharmaceutical compositions comprising the cannabidiol derivatives, or stereoisomers, solvates, prodrugs, metabolites, pharmaceutically acceptable salts or cocrystals thereof, and use thereof in preparing medicament.

BACKGROUND

As an annual herbaceous plant of *Cannabis* in Moraceae, hemp (*Cannabis sativa L.*) is originated in Central Asia and East Asia and is widely distributed in the United States, India, Brazil etc. Hemp has been used as a medicament for a long history, however, due to the addiction and hallucinogenic effect of hemp, its clinical application has been greatly limited. There are hundreds of different chemicals in hemp, and about 70 chemicals among them are named as cannabinoids, which mainly comprise cannabidiol (CBD), cannabinol (CBN), tetrahydrocannabinol (THC) and homologues thereof, among the cannabinoids, the content of cannabidiol (CBD) is the highest. Not only can CBD antagonize the mental activity induced by THC, it also has a wide range of therapeutical effects on neurological diseases comprising anxiety, schizophrenia, addiction, neurodegenerative diseases, neonatal hypoxic-ischemic encephalopathy and epilepsy. In addition, CBD also shows a promising application prospect in anti-tumor, anti-inflammatory, hepatoprotective, anti-pain, anti-anxiety, anti-insomnia, anti-convulsion, anti-vomiting, anti-spasm, anti-oxidation and neuroprotection. However, due to the low oral bioavailability of CBD (human oral bioavailability is about 6%), it is necessary to develop new technologies to improve the absorption, distribution, transport and metabolism of the medicament in vivo, so as to improve the bioavailability and the selectivity of the medicament on target sites, reduce the toxic and side effects of the medicament, and prolong the action time, and the like.

SUMMARY OF THE INVENTION

One object of the present application is to provide cannabidiol derivatives, or stereoisomers, solvates, metabolites, pharmaceutically acceptable salts, cocrystals or prodrugs thereof. Another object of the present application is to provide a pharmaceutical composition comprising the cannabidiol derivative, or stereoisomer, solvate, metabolite, pharmaceutically acceptable salt, cocrystal or prodrug thereof. Yet another object of the present application is to provide use of the above compounds or the composition in preparing medicament.

In one or more embodiments of the present application, the compounds can be converted into their parent drugs after being ingested. When compared with the parent drugs, the compounds according to the present application show higher bioavailability (e.g., oral bioavailability), longer half-life, improved therapeutic effects and reduced toxic and side effects.

One or more embodiments of the present application provide a compound represented by general formula (I), or stereoisomer, solvate, metabolite, pharmaceutically acceptable salt or cocrystal thereof:

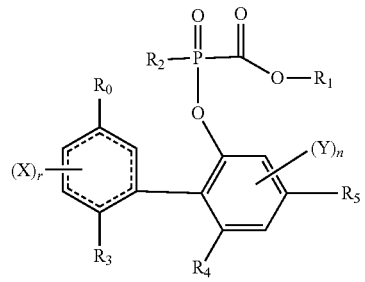

wherein:
X is selected from the group consisting of hydrogen, hydroxyl, $C_{1-6}$ alkyl and halogen;
Y is selected from the group consisting of hydrogen, carboxyl, $C_{1-6}$ alkyl and halogen;
r is selected from the group consisting of 0, 1, 2 and 3;
n is selected from the group consisting of 0, 1 and 2;
$R_0$ is selected from the group consisting of methyl, $C_{3-8}$ carbocyclic group, —$CH_2OH$, —$C(=O)OC_{1-6}$ alkyl, —$C(=O)NR^{b1}R^{b2}$ and carboxyl;
$R_1$ is selected from the group consisting of $C_{1-6}$ alkyl which can be optionally further substituted with 0 to 3 halogen atoms:
$R_2$ is

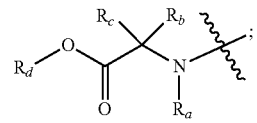

$R_a$ is selected from the group consisting of H and $C_{1-6}$ alkyl;
$R_b$ and $R_c$ are each independently selected from the group consisting of H, $C_{1-6}$ alkyl, amino acid side chain, —$C_{1-6}$ alkylene-$C_{3-12}$ carbocyclic ring and —$C_{1-6}$ alkylene-$C_{3-12}$ heterocyclic ring; wherein the $C_{3-12}$ heterocyclic ring contains 1 to 4 heteroatoms selected from the group consisting of N, O and S; the $C_{1-6}$ alkylene, the $C_{1-6}$ alkyl, the $C_{3-12}$ carbocyclic ring or the $C_{3-12}$ heterocyclic ring is optionally further substituted with 0 to 3 substituents selected from the group consisting of hydroxyl, carboxyl, halogen, cyano, =O, $C_{1-6}$ alkyl, $C_{1-6}$ heteroalkyl, $C_{2-6}$ alkenyl, $C_{2-6}$ alkynyl, —$NR^{b1}R^{b2}$, —$C(=O)OC_{1-6}$ alkyl, —$C(=O)NR^{b1}R^{b2}$, $C_{3-12}$ cycloalkyl, $C_{3-12}$ heterocycloalkyl, $C_{6-12}$ aryl and $C_{5-12}$ heteroaryl; and as substituents, the $C_{1-6}$ alkyl, the $C_{1-6}$ heteroalkyl, the $C_{2-6}$ alkenyl or the $C_{2-6}$ alkynyl is optionally further substituted with one or more substituents selected from the group consisting of hydroxyl, carboxyl, cyano, halogen, —O—$R^{b1}$, —$NR^{b1}R^{b2}$, $C_{3-12}$ cycloalkyl, $C_{3-12}$ heterocycloalkyl, $C_{6-12}$ aryl and $C_{5-12}$ heteroaryl; when the amino acid side chain contains hydroxyl, mercapto or carboxyl, the hydroxyl, the mercapto or the carboxyl is optionally esterified;
$R^{b1}$ and $R^{b2}$ are each independently selected from the group consisting of H, $C_{1-6}$ alkyl, —$C(=O)R^{b3}$ and —$C(=O)NR^{b4}R^{b5}$, wherein the $C_{1-6}$ alkyl is optionally further substituted with one or more substituents selected from the group consisting of hydroxyl, halogen, $C_{1-6}$ alkyl, $C_{1-6}$ alkoxy, $C_{6-12}$ aryl, $C_{5-12}$ heteroaryl, $C_{3-12}$ cycloalkyl and $C_{3-12}$ heterocycloalkyl;

$R^{b3}$ is selected from the group consisting of $C_{1-6}$ alkyl, $C_{1-6}$ alkoxy and $C_{6-12}$ aryl;

$R^{b4}$ and $R^{b5}$ are each independently selected from the group consisting of H and $C_{1-6}$ alkyl; or $R^{b4}$ and $R^{b5}$ together with N atom form a 3 to 12 membered heterocyclic ring containing 1 to 4 heteroatoms selected from the group consisting of N, O and S;

or, $R_b$ and $R_c$ together with the atom to which they are attached form a 3 to 6 membered carbocyclic ring or a 3 to 6 membered heterocyclic ring, wherein the 3 to 6 membered carbocyclic ring or the 3 to 6 membered heterocyclic ring is optionally further substituted with 0 to 3 substituents selected from the group consisting of F, Cl, Br, I, hydroxyl, carboxyl and amino, and the 3 to 6 membered heterocyclic ring contains 1 to 4 heteroatoms selected from the group consisting of N, O and S;

$R_d$ is selected from the group consisting of $C_{1-6}$ alkyl, $C_{2-6}$ alkenyl, $C_{2-6}$ alkynyl, $C_{3-10}$ carbocyclic ring, 3 to 10 membered heterocyclic ring, —$C_{1-6}$ alkylene-$C_{3-10}$ carbocyclic ring, —$C_{1-6}$ alkylene-3 to 10 membered heterocyclic ring, —$C_{1-6}$ alkylene-O—$C_{1-6}$ alkylene-$C_{3-10}$ carbocyclic ring, —$C_{1-6}$ alkylene-O—$C_{1-6}$ alkylene-3 to 10 heterocyclic ring and —$C_{1-6}$ alkylene-O—$C_{1-4}$ alkyl; wherein the $C_{1-6}$ alkylene, the $C_{2-6}$ alkenyl, the $C_{2-6}$ alkynyl, the $C_{1-6}$ alkyl, the $C_{3-10}$ carbocyclic ring or the 3 to 10 membered heterocyclic ring is optionally further substituted with 0 to 4 substituents selected from the group consisting of H, F, Cl, Br, I, hydroxyl, carboxyl, amino, 1-cyclopropylethyl, $C_{1-4}$ alkyl, $C_{1-4}$ alkoxy, —OC(=O)O$R_{d1}$ and —OC(=O)$R_{d2}$, and the 3 to 10 membered heterocyclic ring contains 1 to 6 heteroatoms selected from the group consisting of N, O and S;

$R_{d1}$ and $R_{d2}$ are each independently selected from the group consisting of $C_{1-4}$ alkyl, $C_{3-10}$ carbocyclic ring and 3 to 10 membered heterocyclic ring, wherein the $C_{1-4}$ alkyl, the $C_{3-10}$ carbocyclic ring or the 3 to 10 membered heterocyclic ring is optionally further substituted with 0 to 4 substituents selected from the group consisting of H, F, Cl, Br, I, hydroxyl, carboxyl, $C_{1-4}$ alkyl, $C_{1-4}$ alkoxy, $C_{3-10}$ carbocyclic ring and 3 to 10 membered heterocyclic ring, and the 3 to 10 membered heterocyclic ring contains 1 to 6 heteroatoms selected from the group consisting of N, O and S;

$R_3$ is selected from the group consisting of $C_{1-6}$ alkyl, $C_{3-8}$ carbocyclic ring and $C_{2-6}$ alkenyl, wherein the $C_{1-6}$ alkyl, the $C_{3-8}$ carbocyclic ring or the $C_{2-6}$ alkenyl is optionally further substituted with 0 to 3 substituents selected from the group consisting of halogen, $C_{3-8}$ carbocyclic ring, hydroxyl and $C_{1-6}$ alkyl;

$R_4$ is selected from the group consisting of H, $C_{1-6}$ alkoxy, —C(=O)O$R_{d1}$, —C(=O)$R_{d1}$, —C(=O)C(NH$_2$)—R and

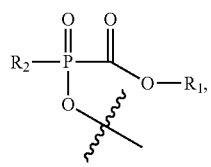

and the amino in —C(=O)CH(NH$_2$)—R optionally forms a polypeptide chain with an amino acid;

R is selected from the group consisting of amino acid side chain; when the amino acid side chain contains hydroxyl, mercapto or carboxyl, the hydroxyl, the mercapto or the carboxyl is optionally esterified;

$R_5$ is selected from the group consisting of $C_{1-12}$ alkyl, $C_{1-12}$ heteroalkyl, $C_{2-12}$ alkenyl, $C_{2-12}$ alkynyl, $C_{3-12}$ carbocyclic group, $C_{3-12}$ heterocyclic group, —$C_{1-6}$ alkylene-$C_{3-12}$ carbocyclic group, —$C_{1-6}$ alkylene-$C_{3-12}$ heterocyclic group, —NR$^{b1}$R$^{b2}$, —$C_{1-6}$ alkylene-C(=O)OC$_{1-6}$ alkyl and —$C_{1-6}$ alkylene-C(=O)NR$^{b1}$R$^{b2}$, wherein the $C_{1-12}$ alkyl, the $C_{1-12}$ heteroalkyl, the $C_{2-12}$ alkenyl, the $C_{2-12}$ alkynyl, $C_{1-6}$ alkylene, the $C_{3-12}$ carbocyclic group or the $C_{3-12}$ heterocyclic group is optionally substituted with one or more substituents selected from the group consisting of hydroxyl, carboxyl, halogen, cyano, =O, $C_{1-6}$ alkyl, —NR$^{b1}$R$^{b2}$, $C_{3-12}$ carbocyclic group, $C_{3-12}$ heterocyclic group, $C_{2-6}$ alkenyl, $C_{2-6}$ alkynyl, —C(=O)OC$_{1-6}$ alkyl, —C(=O)C$_{1-6}$ alkyl, —C(=O)NR$^{b1}$R$^{b2}$, —S(=O)C$_{1-6}$ alkyl and —S(=O)$_2$C$_{1-6}$ alkyl, and as substituents, the $C_{1-6}$ alkyl, the $C_{3-12}$ carbocyclic group or the $C_{3-12}$ heteracyclic group is further substituted with one or more substituents selected from the group consisting of =O, hydroxyl, carboxyl, halogen, cyano, —C(=O)OC$_{1-6}$ alkyl and —C(=O)C$_{1-6}$ alkyl;

⸺ is a single bond or a double bond;

or, the general formula (I) can be optionally substituted with one or more D atoms.

One or more embodiments of the present application provide a compound represented by general formula (II), or stereoisomer, solvate, metabolite, pharmaceutically acceptable salt or cocrystal thereof:

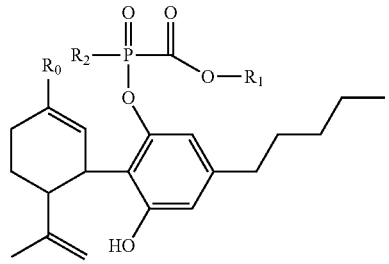

(II)

wherein, $R_0$ is methyl or —CH$_2$OH;

$R_1$ is $C_{1-6}$ alkyl;

$R_2$ is

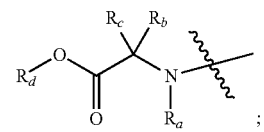

$R_a$ is H;

$R_b$ and $R_c$ are each independently selected from the group consisting of H and amino acid side chain; and when the amino acid side chain contains hydroxyl, mercapto or carboxyl, the hydroxyl, the mercapto and the carboxyl is optionally esterified;

$R_d$ is selected from the group consisting of $C_{1-6}$ alkyl, —$C_{3-10}$ carbocyclic ring or –3 to 10 membered heterocyclic ring, wherein the $C_{1-6}$ alkyl, the $—C_{3-10}$ carbocyclic ring or the 3 to 10 membered heterocyclic ring is optionally further substituted with 0 to 4 substituents selected from the group consisting of H, F, Cl, Br, I, hydroxyl, carboxyl, amino, 1-cyclopropylethyl, $C_{1-4}$ alkyl, $C_{1-4}$ alkoxy, $—OC(=O)OR_{d1}$ and $—OC(=O)R_{d2}$, wherein the 3 to 10 membered heterocyclic ring contains 1 to 6 heteroatoms selected from the group consisting of N, O and S;

$R_{d1}$ and $R_{d2}$ are each independently $C_{1-4}$ alkyl;

or, the general formula (II) is optionally substituted with one or more D atoms.

One or more embodiments of the present application provide a compound represented by general formula (III), or stereoisomer, solvate, metabolite, pharmaceutically acceptable salt or cocrystal thereof:

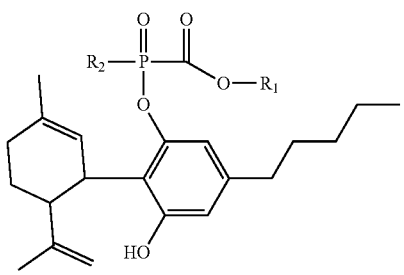

(III)

wherein, $R_1$ is $C_{1-6}$ alkyl;

$R_2$ is

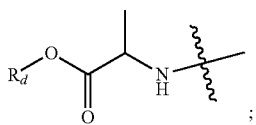

;

$R_d$ is selected from the group consisting of $C_{1-6}$ alkyl, $—C_{3-10}$ carbocyclic ring and $-3$ to 10 membered heterocyclic ring, wherein the $C_{1-6}$ alkyl, the $—C_{3-10}$ carbocyclic ring or the $-3$ to 10 membered heterocyclic ring is optionally further substituted with 0 to 4 substituents selected from the group consisting of H, F, Cl, Br, I, hydroxyl, carboxyl, amino, 1-cyclopropylethyl, $C_{1-4}$ alkyl, $C_{1-4}$ alkoxy, $—OC(=O)OR_{d1}$ or $—OC(=O)R_{d2}$, and the 3 to 10 membered heterocyclic group contains 1 to 6 heteroatoms selected from the group consisting of N, O and S;

$R_{d1}$ and $R_{d2}$ are each independently $C_{1-4}$ alkyl;

or, the H atoms in the general formula (III) are optionally substituted with one or more D atoms.

One or more embodiments of the present application provide the following compounds, or stereoisomers, solvates, metabolites, pharmaceutically acceptable salts or cocrystals thereof, wherein the compounds have one of the following structures:

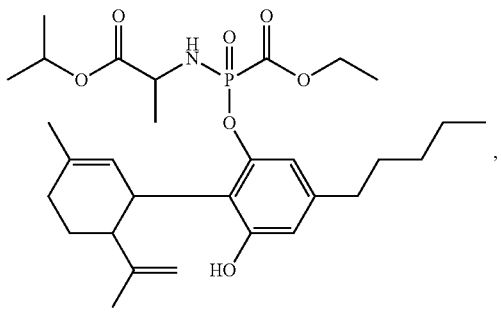

,

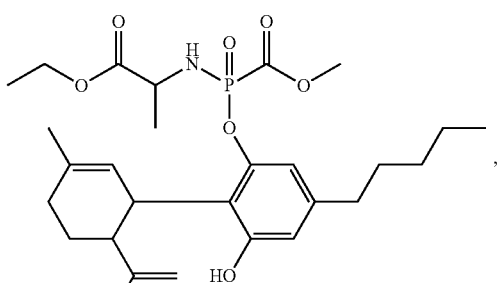

,

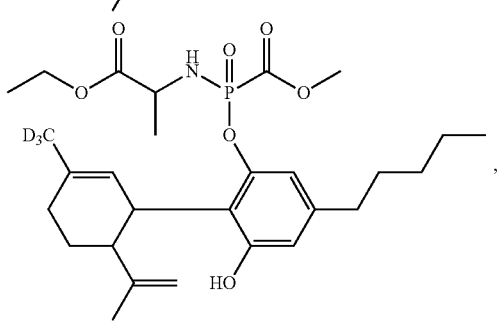

,

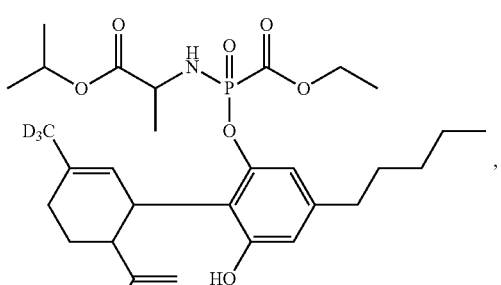

,

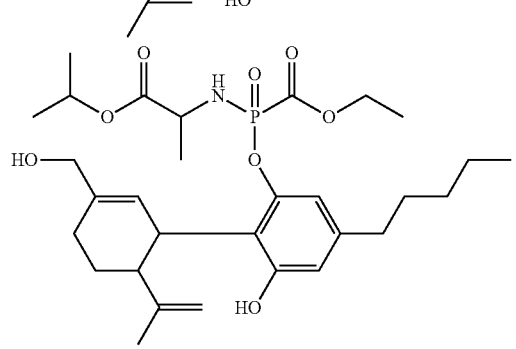

,

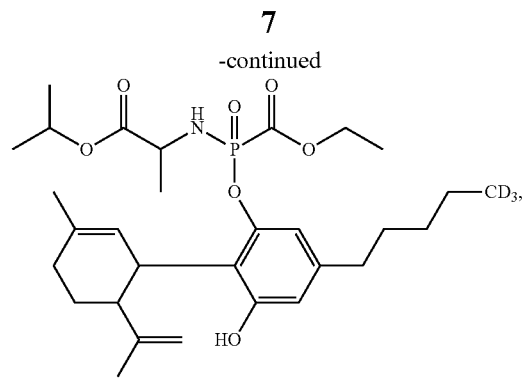
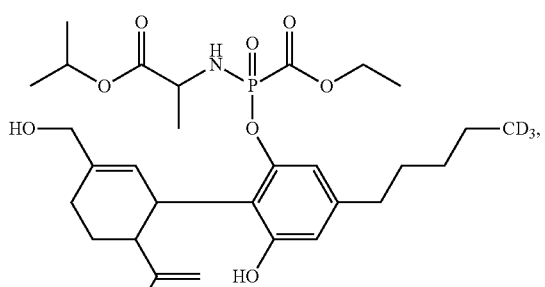
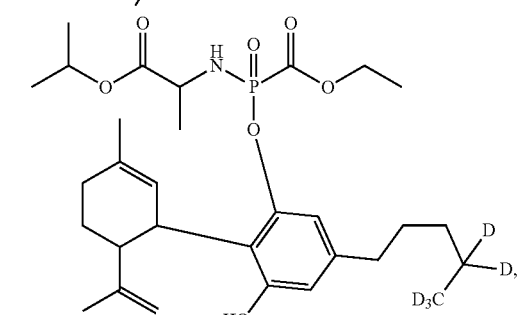
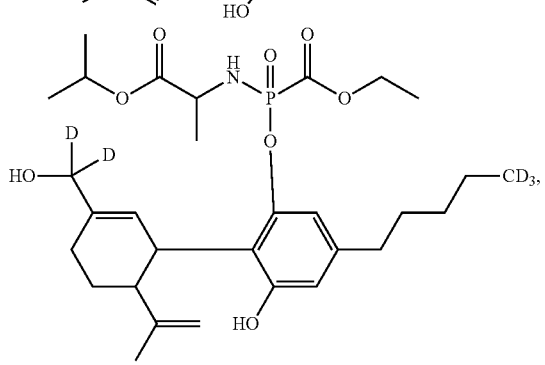
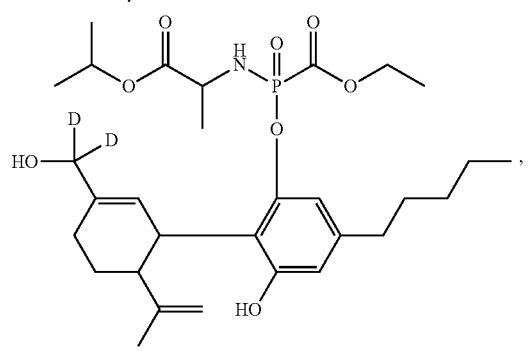
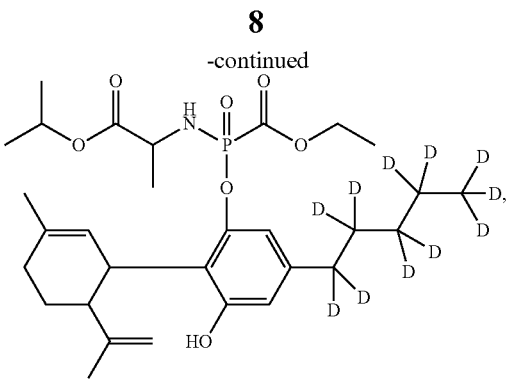
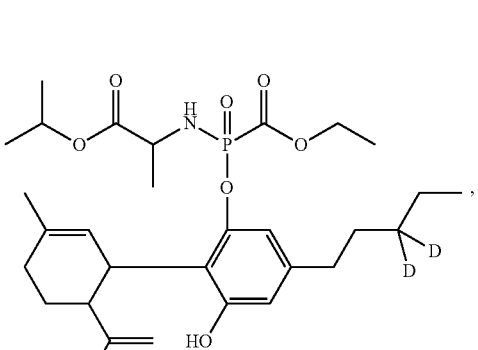
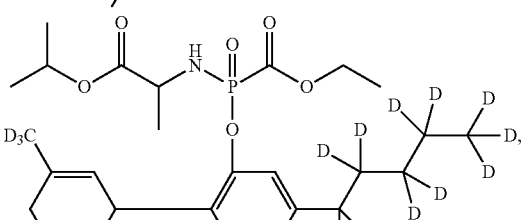
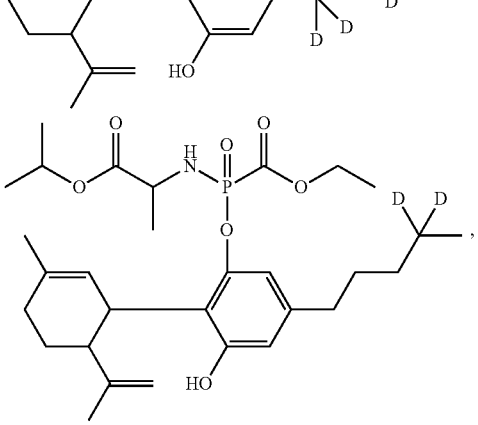
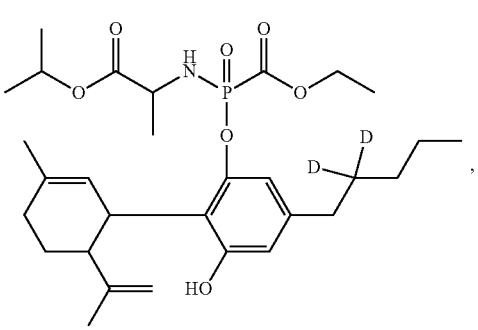

-continued

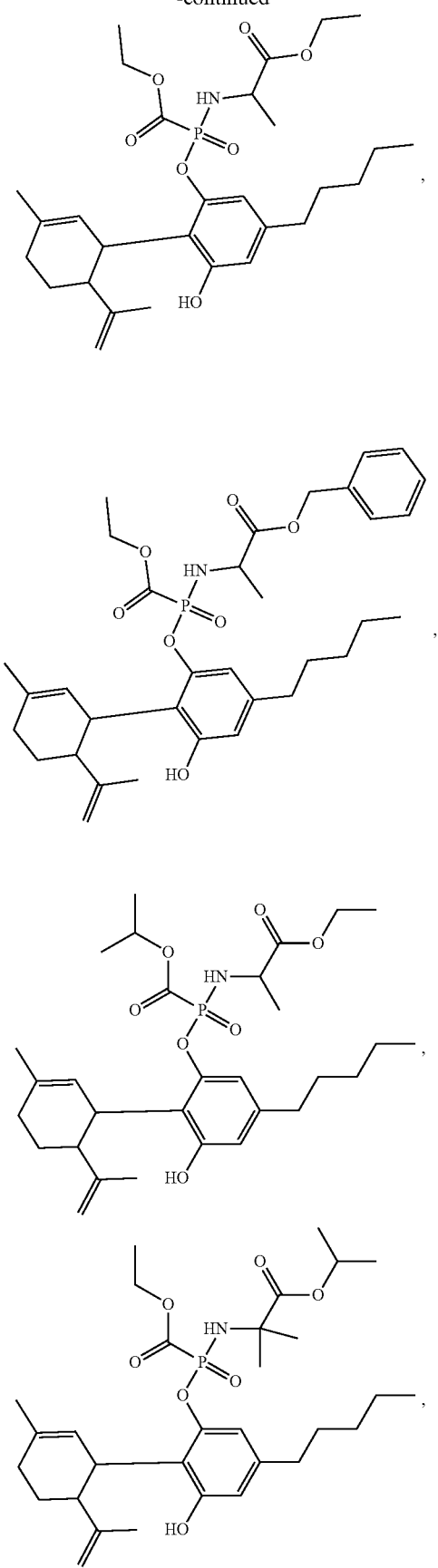

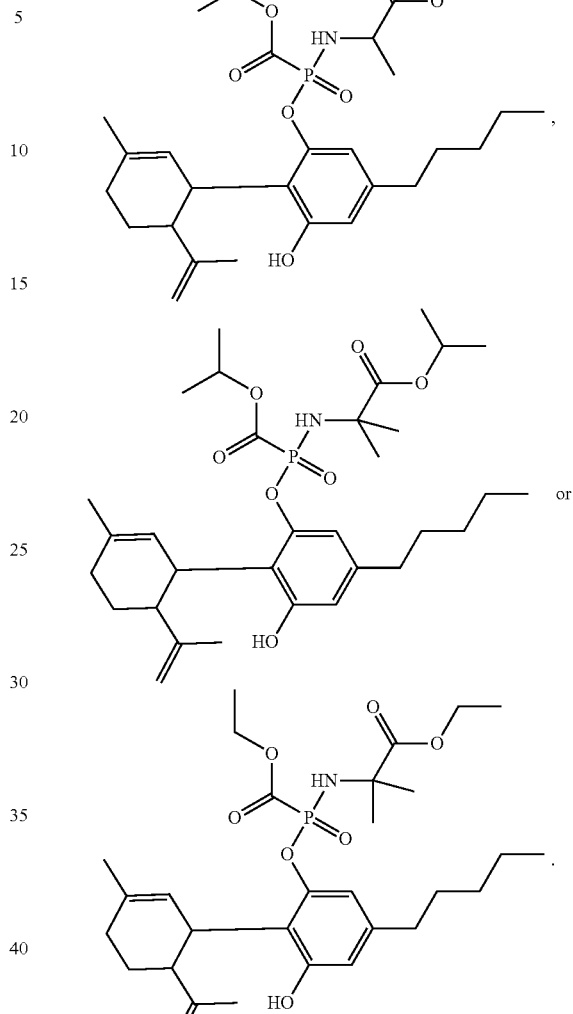

One or more embodiments of the present application provide a pharmaceutical composition comprising:
(1) the compound, or stereoisomer, solvate, metabolite, pharmaceutically acceptable salt or cocrystal thereof according to the present application;
(2) optional one or more other active ingredients; and
(3) a pharmaceutically acceptable carrier and/or excipient.

In one or more embodiments of the present application, the other active ingredient is one or more selected from the group consisting of ginkgolide, antineoplastic agent, anticoagulant, antiepileptic agent, antidepressant, anxiolytic, hypnotic, analgesic and anesthetic, or stereoisomer, hydrate, metabolite, solvate, pharmaceutically acceptable salt or cocrystal of the other active ingredient.

One or more embodiments of the present application provide use of the compound, or stereoisomer, solvate, metabolite, pharmaceutically acceptable salt or cocrystal thereof according to the present application or a pharmaceutical composition comprising the compound, or stereoisomer, solvate, metabolite, pharmaceutically acceptable salt or cocrystal thereof in the preparation of medicament for treating post-traumatic stress disorder, facial paralysis, stroke, migraine, coronary heart disease stable angina pectoris, cerebral infarction, thromboembolism, myocardial infarction, cardiac ischemia, coronary artery disease, hypertension, cerebral ischemia, improvement of sexual function, spasm, acute and chronic pain, fibromyalgia, postoperative pain, cluster headache, tension headache, back pain, limb pain, osphyalgia, neck pain, neuropathic pain, cancer pain, trigeminal neuralgia, arthritic pain, inflammatory pain, Dravet syndrome, Lennox-Gastaut syndrome, Prader-Willi syndrome, Sturge-Weber syndrome, fragile X syndrome, anxiety, bipolar affective disorder, autism, general anxiety disorder, social anxiety disorder, epilepsy, Parkinson's disease, Alzheimer's disease, Huntington's disease, opioid abuse, alcoholism, nicotine addiction, anorexia, cachexia, chemotherapy-related nausea and vomiting, postoperative nausea and vomiting, amyotrophic lateral sclerosis (ALS), Friedreich ataxia, schizophrenia, obsessive-compulsive disorder, multiple sclerosis, depression, sleep disorder, spasm caused by multiple sclerosis, dysmyotonia, sleep apnea, paralytic dementia, hypomnesis or glioblastoma.

One or more embodiments of the present application provide the above compound, or stereoisomer, solvate, metabolite, pharmaceutically acceptable salt or cocrystal thereof according to the present application for use as a medicament.

One or more embodiments of the present application provide the above compound, or stereoisomer, solvate, metabolite, pharmaceutically acceptable salt or cocrystal thereof according to the present application used for the treatment of: post-traumatic stress disorder, facial paralysis, stroke, migraine, coronary heart disease stable angina pectoris, cerebral infarction, thromboembolism, myocardial infarction, cardiac ischemia, coronary artery disease, hypertension, cerebral ischemia, improvement of sexual function, spasm, acute and chronic pain, fibromyalgia, postoperative pain, cluster headache, tension headache, back pain, limb pain, osphyalgia, neck pain, neuropathic pain, cancer pain, trigeminal neuralgia, arthritic pain, inflammatory pain, Dravet syndrome, Lennox-Gastaut syndrome, Prader-Willi syndrome, Sturge-Weber syndrome, fragile X syndrome, anxiety, bipolar affective disorder, autism, general anxiety disorder, social anxiety disorder, epilepsy, Parkinson's disease, Alzheimer's disease, Huntington's disease, opioid abuse, alcoholism, nicotine addiction, anorexia, cachexia, chemotherapy-related nausea and vomiting, postoperative nausea and vomiting, amyotrophic lateral sclerosis (ALS), Friedreich ataxia, schizophrenia, obsessive-compulsive disorder, multiple sclerosis, depression, sleep disorder, spasm caused by multiple sclerosis, dysmyotonia, sleep apnea, paralytic dementia, hypomnesis or glioblastoma.

One or more embodiments of the present application provide a method for treating the following disease, comprising administrating the above compound, or stereoisomer, solvate, metabolite, pharmaceutically acceptable salt or cocrystal thereof according to the present application to a subject in need thereof: post-traumatic stress disorder, facial paralysis, stroke, migraine, coronary heart disease stable angina pectoris, cerebral infarction, thromboembolism, myocardial infarction, cardiac ischemia, coronary artery disease, hypertension, cerebral ischemia, improvement of sexual function, spasm, acute and chronic pain, fibromyalgia, postoperative pain, cluster headache, tension headache, back pain, limb pain, osphyalgia, neck pain, neuropathic pain, cancer pain, trigeminal neuralgia, arthritic pain, inflammatory pain, Dravet syndrome, Lennox-Gastaut syndrome, Prader-Willi syndrome, Sturge-Weber syndrome, fragile X syndrome, anxiety, bipolar affective disorder, autism, general anxiety disorder, social anxiety disorder, epilepsy, Parkinson's disease, Alzheimer's disease, Huntington's disease, opioid abuse, alcoholism, nicotine addiction, anorexia, cachexia, chemotherapy-related nausea and vomiting, postoperative nausea and vomiting, amyotrophic lateral sclerosis (ALS), Friedreich ataxia, schizophrenia, obsessive-compulsive disorder, multiple sclerosis, depression, sleep disorder, spasm caused by multiple sclerosis, dysmyotonia, sleep apnea, paralytic dementia, hypomnesis or glioblastoma.

Unless otherwise stated, the terms used in the description and claims have the following meanings.

The carbon, hydrogen, oxygen, sulfur, nitrogen or F, Cl, Br and I involved in the groups and compounds of the present application all include their isotopes, and the carbon, hydrogen, oxygen, sulfur or nitrogen involved in the groups and compounds of the present application are optionally further replaced by one or more corresponding isotopes, wherein the carbon isotopes comprise $^{12}C$, $^{13}C$ and $^{14}C$, and the hydrogen isotopes comprise protium (H), deuterium (D which is also referred as heavy hydrogen), tritium (T which is also referred as superheavy hydrogen); oxygen isotopes comprise $^{16}O$, $^{17}O$ and $^{18}O$, sulfur isotopes comprise $^{32}S$, $^{33}S$, $^{34}S$ and $^{36}S$, nitrogen isotopes comprise $^{14}N$ and $^{15}N$, fluorine isotopes comprise $^{17}F$ and $^{19}F$, chlorine isotopes comprise $^{35}Cl$ and $^{37}Cl$, and bromine isotopes comprise $^{79}Br$ and $^{81}Br$.

"Hydrocarbyl" refers to a group containing only carbon and hydrogen atoms.

"Alkyl" refers to a linear or branched saturated aliphatic hydrocarbyl having 1 to 20 carbon atoms, preferably an alkyl having 1 to 8 (for example, 1, 2, 3, 4, 5, 6, 7, 8) carbon atoms, more preferably an alkyl having 1 to 6 carbon atoms, and even more preferably an alkyl group having 1 to 4 carbon atoms. Non-limiting examples thereof comprise methyl, ethyl, n-propyl, isopropyl, n-butyl, sec-butyl, neobutyl, tert-butyl, n-pentyl, isopentyl, neopentyl, n-hexyl and various branched isomers thereof; when the alkyl is substituted, the alkyl can be optionally further substituted with one or more substituents.

"Heteroalkyl" refers to a group in which at least one C atom of an alkyl is replaced by O, S, N or P atom. Non-limiting examples thereof comprise thiomethyl, thioethyl, thio-n-propyl, thioisopropyl, thio-n-butyl, thio-sec-butyl and thio-tert-butyl. The definition of alkyl is the same as that of the "alkyl" mentioned above.

"Alkoxy" refers to a group in which at least one C atom of an alkyl is replaced by an oxygen atom. Non-limiting examples thereof comprise methoxy, ethoxy, n-propoxy, isopropoxy, n-butoxy, sec-butoxy, tert-butoxy, n-pentoxy, n-hexyloxy, cyclopropyloxy and cyclobutyloxy. The definition of alkyl is the same as that of the "alkyl" mentioned above.

"Alkenyl" refers to a straight or branched unsaturated aliphatic hydrocarbyl containing 1 to 10 (e.g., 1, 2, 3, 4, 5, 6, 7, 8, 9, 10) carbon-carbon double bonds and consisting of 2 to 20 carbon atoms, preferably 2 to 12 (e.g., 2, 3, 4, 5, 6, 7, 8, 9, 10, 11, 12) carbon atoms, more preferably 2 to 8 carbon atoms, even more preferably 2 to 6 carbon atoms. Non-limiting examples thereof comprise vinyl, propylen-2-yl, buten-2-yl, buten-2-yl, penten-2-yl, penten-4-yl, hexen-2-yl, hexen-3-yl, hepten-2-yl, hepten-3-yl, hepten-4-yl, octen-3-yl, nonen-3-yl, decen-4-yl and undecen-3-yl. The alkenyl may optionally be further substituted with one or more substituents.

"Alkynyl" refers to a straight or branched unsaturated aliphatic hydrocarbyl containing 1 to 10 (e.g., 1, 2, 3, 4, 5, 6, 7, 8, 9 or 10) carbon-carbon triple bonds and consisting of 2 to 20 carbon atoms, preferably 2 to 12 (e.g., 2, 3, 4, 5, 6, 7, 8, 9, 10, 11 or 12) carbon atoms, more preferably 2 to 8 carbon atoms, even more preferably 2 to 6 carbon atoms. Non-limiting examples thereof comprise acetenyl, propyn-1-yl, propyn-2-yl, butyn-1-yl, butyn-2-yl, butyn-3-yl, 3,3-dimethylbutyn-2-yl, pentyn-1-yl, pentyn-2-yl, hexyn-1-yl, 1-heptyn-1-yl, heptyn-3-yl, heptyn-4-yl, octyne-3-yl, nonyn-3-yl, decyn-4-yl, undecyn-3-yl, and dodecyn-4-yl. The alkynyl may optionally be further substituted with one or more substituents.

"Aryl" refers to a substituted or unsubstituted aromatic ring, which can be 5 to 8 (e.g., 5, 6, 7, 8) membered monocyclic ring, a 5 to 12 (e.g., 5, 6, 7, 8, 9, 10, 11, 12) membered bicyclic ring, or a 10 to 15 (e.g., 10, 11, 12, 13, 14, 15) membered tricyclic system. The aryl can be a bridged ring or a spiro ring. Non-limiting examples thereof comprise phenyl and naphthyl. The aryl may optionally be further substituted with one or more substituents.

"Heteroaryl" refers to a substituted or unsubstituted aromatic ring containing 1 to 6 (e.g., 1, 2, 3, 4, 5, or 6) heteroatoms selected from the group consisting of N, O and S, which can be a 3 to 8 (e.g., 3, 4, 5, 6, 7, 8) membered monocyclic ring, a 5 to 12 (e.g., 5, 6, 7, 8, 9, 10, 11, 12) membered bicyclic ring, or 10 to 15 (e.g., 10, 11, 12, 13, 14, 15) membered tricyclic system. The heteroaryl is preferably a 5 to 8 membered heteroaryl. Optionally substituted 1 to 4 (for example, 1, 2, 3, 4) N or S in the ring of the heteroaryl can be oxidized to various oxidation states. The heteroaryl can be connected to a heteroatom or a carbon atom, and the heteroaryl can be a bridged ring or a spiro ring. Non-limiting examples thereof comprise pyridyl, furyl, thienyl, pyranyl, pyrrolyl, pyrimidinyl, pyrazinyl, pyridazinyl, imidazolyl, piperidinyl, benzimidazolyl, benzopyridyl and pyrrolopyridinyl. The heteroaryl may optionally be further substituted with one or more substituents.

"Carbocyclic group" or "carbocyclic ring" refers to a saturated or unsaturated aromatic ring or non-aromatic ring. When it is an aromatic ring, its definition is the same as the above definition of "aryl"; when it is a non-aromatic ring, it can be a 3 to 10 (e.g., 3, 4, 5, 6, 7, 8, 9, 10) membered monocyclic ring, a 4 to 12 (e.g., 4, 5, 6, 7, 8, 9, 10, 11, 12) membered bicyclic ring, or a 10 to 15 (e.g., 10, 11, 12, 13, 14, 15) membered tricyclic system. Non-limiting examples thereof comprise cyclopropyl, cyclobutyl, cyclopentyl, 1-cyclopenten-1-yl, 1-cyclopenten-2-yl, 1-cyclopenten-3-yl, cyclohexyl, 1-cyclohexen-2-yl, 1-cyclohexen-3-yl, cyclohexenyl, cyclohexadienyl, cycloheptyl, cyclooctyl, cyclononyl, cyclodecyl, cycloundecyl, cyclododecyl,

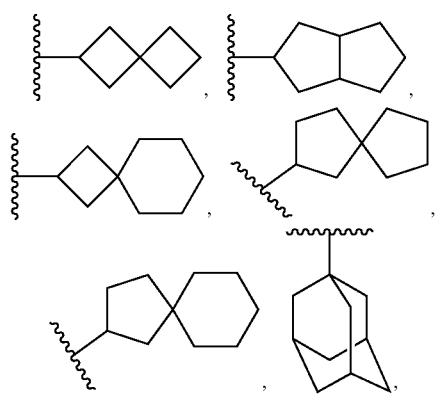

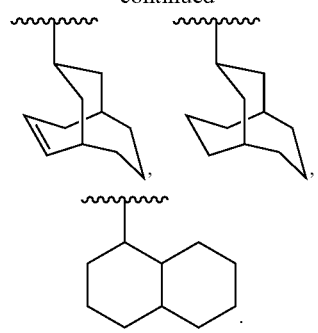

The "carbocyclic group" or "carbocyclic ring" may optionally be further substituted with one or more substituents.

"Heterocyclic group" or "heterocyclic ring" refers to a saturated or unsaturated aromatic heterocyclic ring or non-aromatic heterocyclic ring. When it is an aromatic heterocyclic ring, its definition is the same as that of "heteroaryl" above. When it is a non-aromatic heterocyclic ring, it can be a 3 to 10 (e.g., 3, 4, 5, 6, 7, 8, 9, 10) membered monocyclic ring, a 4 to 12 (e.g., 4, 5, 6, 7, 8, 9, 10, 11, 12) membered bicyclic ring, or a 10 to 15 (e.g., 10, 11, 12, 13, 14, 15) membered tricyclic system and contains 1 to 4 (e.g., 1, 2, 3, 4) heteroatoms selected from the group consisting of N, O and S. It is preferably a 3 to 8 membered heterocyclic group. Optionally substituted 1 to 4 (e.g., 1, 2, 3, 4) N or S in the ring of "heterocyclic group" or "heterocyclic ring" can be oxidized into various oxidation states; "heterocyclic group" or "heterocyclic ring" can be connected to a heteroatom or a carbon atom; "heterocyclic group" or "heterocyclic ring" can be a bridged ring or a spiro ring. Non-limiting examples thereof comprise oxiranyl, epoxypropyl, aziridinyl, oxetanyl, azetidinyl, thietanyl, 1,3-dioxolanyl, 1,4-dioxolanyl, 1,3-dioxanyl, azepanyl, oxepanyl, thiepanyl, oxazepinyl, diazepinyl, thiazepinyl, pyridyl, piperidinyl, homopiperidinyl, furyl, thienyl, pyranyl, N-alkylpyrrolyl, pyrimidinyl, pyridinyl, pyridazinyl, piperazinyl, homopiperazinyl, imidazolyl, piperidinyl, morpholinyl, thiomorpholinyl, thioxanyl, 1,3-dithianyl, dihydrofuranyl, dithiolanyl, tetrahydrofuranyl, tetrahydrothienyl, tetrahydropyranyl, tetrahydrothiopyranyl, tetrahydropyrrolyl, tetrahydroimidazolyl, tetrahydrothiazolyl, tetrahydropyranyl, benzimidazolyl, benzopyridyl, pyrrolopyridyl, benzodihydrofuranyl, 2-pyrrolinyl, 3-pyrrolinyl, indolinyl, 2H-pyranyl, 4H-pyranyl, dioxanyl, 1,3-dioxolanyl, pyrazolinyl, dithianyl, dithiolanyl, dihydrothienyl, pyrazolidinyl, imidazolinyl, imidazolidinyl, 1,2,3,4-tetrahydroisoquinolinyl, 3-azabicyclo[3.1.0]hexyl, 3-azabicyclo[4.1.0]heptyl, azabicyclo[2.2.2]hexyl, 3H-indolylquinazinyl, N-pyridylurea, 1,1-dioxothiomorpholinyl, azabicyclo[3.2.1]octyl,

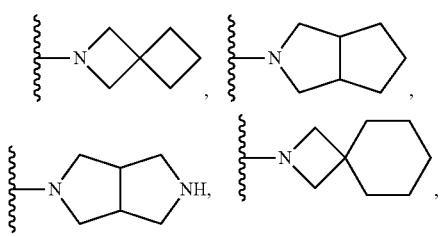

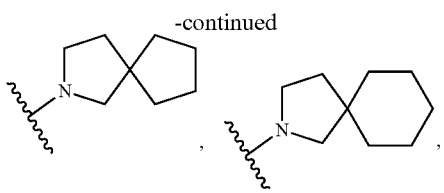

azabicyclo[5.2.0]nonyl, oxatricyclo[5.3.1.1]dodecyl, azaadamantyl and oxaspiro[3.3]heptyl. The "heterocyclic group" or "heterocyclic ring" may optionally be further substituted with one or more substituents.

"Cycloalkyl" refers to a saturated cyclic hydrocarbyl, which can be a 3 to 10 (e.g., 3, 4, 5, 6, 7, 8, 9, 10) membered monocyclic ring, a 4 to 12 (e.g., 4, 5, 6, 7, 8, 9, 10, 11, 12) membered bicyclic ring or 10 to 20 (e.g., 4, 5, 6, 7, 8, 9, 10, 11, 12) membered polycyclic system. There are preferably 3 to 10, more preferably 3 to 8 ring carbon atoms in a cycloalkyl. Non-limiting examples of "cycloalkyl" include cyclopropyl, cyclobutyl, cyclopentyl, cyclohexyl, cycloheptyl, cyclooctyl, cyclopropenyl, cyclobutenyl, cyclopentenyl, cyclohexenyl, cycloheptenyl, 1,5-cyclooctadienyl, 1,4-cyclohexadienyl and cycloheptatrienyl, etc. When the cycloalkyl is substituted, it can be optionally further substituted with one or more substituents.

"Heterocycloalkyl" refers to a substituted or unsubstituted saturated non-aromatic ring group, which can be 3 to 8 (e.g., 3, 4, 5, 6, 7, 8) membered monocyclic ring, 4 to 12 (e.g., 4, 5, 6, 7, 8, 9, 10, 11, 12) membered bicyclic ring or 10 to 15 (e.g., 10, 11, 12, 13, 14, 15) membered tricyclic system, and contains 1, 2 or 3 heteroatoms selected from the group consisting of N, O and S. It is preferably a 3 to 8 membered heterocyclic group. Optionally substituted N or S in the ring of "heterocycloalkyl" can be oxidized to various oxidation states; "heterocycloalkyl" can be connected to a heteroatom or a carbon atom; and the "heterocycloalkyl" can be a bridged ring or a spiro ring. Non-limiting examples of "heterocycloalkyl" comprise oxiranyl, aziridinyl, oxetanyl, azetidinyl, 1,3-dioxolanyl, 1,4-dioxolanyl, 1,3-dioxanyl, azepanyl, piperidinyl, piperidinyl, morpholinyl, thiomorpholinyl, 1,3-dithianyl, tetrahydrofuranyl, tetrahydropyrrolyl, tetrahydroimidazolyl, tetrahydrothiazolyl, tetrahydropyranyl, azabicyclo[3.2.1]octyl, azabicyclo[5.2.0]nonyl, oxatricyclo[5.3.1.1]dodecyl, azaadamantyl and oxaspiro [3.3]heptyl.

When the above-mentioned "alkyl", "alkoxy", "alkenyl", "alkynyl", "aryl", "heteroaryl", "carbocyclic group", "carbocyclic ring", "heterocyclic group", "heterocyclic ring", "cycloalkyl", "heterocycloalkyl" or "heterocyclic group" are substituted, they may be optionally substituted with 0, 1, 2, 3, 4, 5, 6, 7, 8, 9 or 10 substituents selected from the group consisting of F, Cl, Br, I, hydroxyl, mercapto, nitro, cyano, amino, $C_{1-6}$ alkylamino, =O, $C_{1-6}$ alkyl, $C_{1-6}$ alkoxy, $C_{2-6}$ alkenyl, $C_{2-6}$ alkynyl, —$NR^{q4}R^{q5}$, =$NR^{q6}$, —C(=O)O$C_{1-6}$ alkyl, —OC(=O)$C_{1-6}$ alkyl, —C(=O)$NR^{q4}R^{q5}$, $C_{3-8}$ cycloalkyl, $C_{3-8}$ heterocycloalkyl, $C_{6-10}$ aryl, $C_{5-10}$ heteroaryl, —C(=O)O$C_{6-10}$ aryl, —OC(=O)$C_{6-10}$ aryl, —OC(=O)$C_{5-10}$ heteroaryl, —C(=O)O$C_{5-10}$ heteroaryl, —OC(=O)$C_{3-8}$ heterocycloalkyl, —C(=O)O$C_{3-8}$ heterocycloalkyl, —OC(=O)$C_{3-8}$ cycloalkyl, —C(=O)O$C_{3-8}$ cycloalkyl, —NHC(=O)$C_{3-8}$ heterocycloalkyl, —NHC(=O)$C_{6-10}$ aryl, —NHC(=O)$C_{5-10}$ heteroaryl, —NHC(=O)$C_{3-8}$ cycloalkyl, —NHC(=O)$C_{3-8}$ heterocycloalkyl, —NHC(=O)$C_{2-6}$ alkenyl and —NHC(=O)$C_{2-6}$ alkynyl, wherein the substituents $C_{1-6}$ alkyl, $C_{1-6}$ alkoxy, $C_{2-6}$ alkenyl, $C_{2-6}$ alkynyl, $C_{3-8}$ cycloalkyl, $C_{3-8}$heterocycloalkyl, $C_{6-10}$ aryl, $C_{5-10}$ heteroaryl, —NHC(=O)$C_{6-10}$ aryl, —NHC(=O)$C_{5-10}$ heteroaryl, —NHC(=O)$C_{3-8}$ heterocycloalkyl or —NHC(=O)$C_{3-8}$ cycloalkyl can be optionally substituted with 1 to 3 substituents selected from the group consisting of OH, F, Cl, Br, I, $C_{1-6}$ alkyl, $C_{1-6}$ alkoxy, —$NR^{q4}R^{q5}$ and =O. $R^{q1}$ is selected from the group consisting of $C_{1-6}$ alkyl, $C_{1-6}$ alkoxy and $C_{6-10}$ aryl; $R^{q2}$ or $R^{13}$ is selected from the group consisting of H and $C_{1-6}$ alkyl; wherein, $R^{q4}$ and $R^{q5}$ are selected from the group consisting of H, $C_{1-6}$ alkyl, —NH(C=$NR^{q1}$)$NR^{q2}R^{q3}$, —S(=O)$_2$ $NR^{q2}R^{q3}$, —C(=O)$R^{q1}$ and —C(=O)$NR^{q2}R^{q3}$, and the $C_{1-6}$ alkyl is optionally substituted with one or more substituents selected from the group consisting of OH, F, Cl, Br, I, $C_{1-6}$ alkyl, $C_{1-6}$ alkoxy, $C_{6-10}$ aryl, $C_{50-10}$ heteroaryl, $C_{3-8}$ cycloalkyl, and $C_{3-8}$ heterocycloalkyl; or $R^{q4}$ and V together with N atom form a 3 to 8 membered heterocyclic ring containing one or more heteroatoms selected from the group consisting of N, O and S.

"Amino acid side chain" refers to a group other than amino and carboxyl groups in an amino acid molecule.

"Pharmaceutically acceptable salt" or "pharmaceutically acceptable salt thereof" means that the compounds of the present application maintains the biological effectiveness and characteristics of the free acid or free base, and the salts can be obtained by reacting the free acid with a non-toxic inorganic base or organic base, or the salts can be obtained by reacting the free base with a non-toxic inorganic acid or organic acid.

"Pharmaceutical composition" refers to a mixture of one or more compounds according to the present application, pharmaceutically acceptable salts or prodrugs thereof and other chemical components, wherein "other chemical components" refer to pharmaceutically acceptable carriers, excipients and/or one or more other therapeutic agents.

"Carrier" refers to a material that does not cause obvious irritation to organisms and does not eliminate the biological activity and characteristics of the administered compound.

"Excipient" refers to inert substances added to pharmaceutical compositions to facilitate the administration of compounds. Non-limiting examples include calcium carbonate, calcium phosphate, sugar, starch, cellulose derivatives (including microcrystalline cellulose), gelatin, vegetable oil, polyethylene glycols, diluents, granulating agents, lubricants, adhesives and disintegrating agents.

"Prodrug" refers to a compound which can be converted into the compound according to the present application having biological activity by metabolism in vivo. The prodrugs of the present application can be prepared by modifying amino or carboxyl in the compound of the present application and the modification can be removed by conventional operation or in vivo to obtain the parent compound. When the prodrug of the present application is administered to a mammalian subject, the prodrug is cleaved to form free amino or carboxyl.

"Cocrystal" refers to the crystal formed by the combinations of active pharmaceutical ingredients (API) and cocrystal former (CCF) under the action of hydrogen bonds or other noncovalent bonds, in which the pure states of API and CCF are both solids at room temperature, and there is a fixed stoichiometric ratio among the components. Cocrystal is a multi-component crystal, which comprises binary cocrystal formed between two neutral solids and multicomponent cocrystal formed by neutral solids and salts or solvates.

"Stereoisomers" refer to isomers produced by different spatial arrangements of atoms in molecules, including cis-trans isomers, enantiomers and conformational isomers.

"Optional", "optionally", "selective" or "selectively" means that the event or condition described subsequently can, but does not necessarily, occur, and the description comprises the situation in which the event or condition occurs and the situation in which the event or condition does not occur. For example, "heterocyclic group optionally substituted with alkyl" means that the alkyl group may, but does not necessarily exist, and the description comprises the situation where the heterocyclic group is substituted with alkyl and the situation where the heterocyclic group is not substituted with alkyl.

Specific embodiments are described in detail in the description of the present application, and those skilled in the art should realize that the following embodiments are exemplary and cannot be understood as a limitation to the present application. Those skilled in the art can make improvements and modifications to the present application without departing from the principle of the present application, the technical solutions obtained by these improvements and modifications also fall within the protection scope of the claims of the present application.

SPECIFIC EMBODIMENTS

The following examples will illustrate the technical solution of the present application in detail, and the scope of the present application includes, but is not limited to these examples.

The structures of the compounds were determined by nuclear magnetic resonance (NMR) or/and mass spectrometry (MS). NMR shift (δ) was given in units of $10^{-6}$ (ppm). The NMR test was conducted by using nuclear magnetic instrument (Bruker Avance III 400 and Bruker Avance 300), and the solvent for the test was deuterated dimethyl sulfoxide (DMSO-$d_6$), deuterated chloroform (CDCl$_3$), deuterated methanol (CD$_3$OD), and the internal standard was tetramethylsilane (TMS).

MS test was conducted on Agilent 6120B (ESI) and Agilent 6120B (APCI).

HPLC test was conducted on Agilent 1260DAD high pressure liquid chromatograph (zorbax sb-C18 100×4.6 mm, 3.5 μm).

HSGF254 silica gel plate from Yantai Huanghai or Qingdao GF254 silica gel plate was used for thin layer chromatography (TLC), and the size of the silica gel plate for thin layer chromatography (TLC) was 0.15 mm to 0.20 mm, and the size of the silica gel plate for thin layer chromatography separation and purification products was 0.4 mm to 0.5 mm.

Silica gel of 200-300 mesh by Yantai Huanghai was generally used as a carrier of the column chromatography.

The known starting materials in the present application can be synthesized by using the methods known in the field, or can be purchased from Titan Technology company, Annaiji Chemical company, Shanghai DEMO Medical Tech Co., Ltd, Chengdu Kelong Chemical company, Shaoyuan Chemical Technology company, Bailingwei Technology company, etc.

Nitrogen atmosphere means that the reaction flask was connected with a nitrogen balloon with a volume of about 1 L.

Hydrogen atmosphere means that the reaction flask was connected with a hydrogen balloon with a volume of about 1 L.

Hydrogenation reaction was usually vacuumized, filled with hydrogen, and repeated for 3 times.

Unless otherwise stated in Examples, the reaction was carried out in nitrogen atmosphere.

Unless otherwise stated in Examples, the solution was an aqueous solution.

Unless otherwise stated in Examples, the reaction temperature was room temperature, and the most suitable reaction temperature for room temperature was 20° C.-30° C.

DCM: dichloromethane;
EA: ethyl acetate;
HCl: hydrochloric acid;
THF: tetrahydrofuran;
DMF: N,N-dimethyl formamide;
PE: petroleum ether;
TLC: thin layer chromatography;
SFC: supercritical fluid chromatography;
NCS: N-chlorosuccinimide;
Pd(dppf)Cl$_2$: [1,1'-bis (diphenylphosphine) ferrocene]palladium dichloride.

EXAMPLES

The technical solution of the present application will be illustrated by the following examples in detail; and the scope of the present application comprises but is not limited to the examples.

Example 1

Isopropyl((ethoxycarbonyl)(((1'R,2'R)-6-hydroxy-5'-methyl-4-pentyl-2'-(prop-1-en-2-yl)-1',2',3',4'-tetrahydro-[1,1'-biphenyl]-2-yl)oxy)phosphoryl)-L-alaninate (Compound 1)

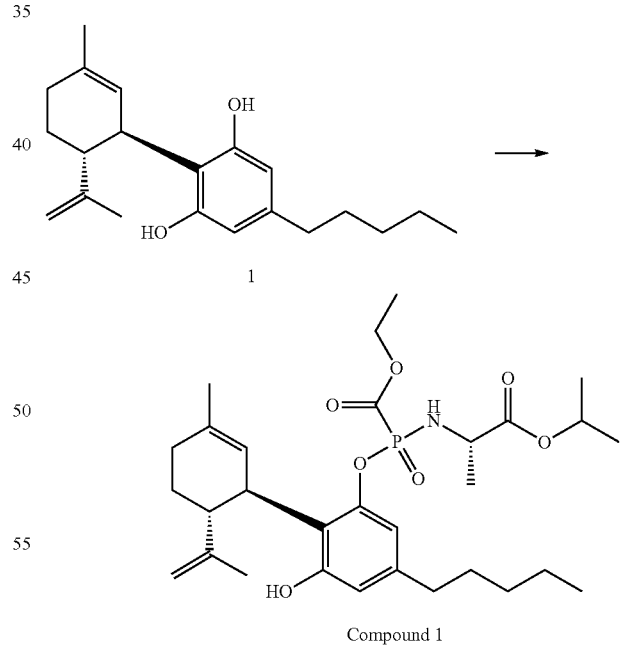

Ethyl (dichlorophosphoryl) formate (0.31 g, 1.6 mmol) was dissolved in dichloromethane (1 ml) in a dry round-bottom flask, triethylamine (0.25 mL, 1.1 eq) was added thereto at −60° C., and then the solution of isopropyl L-alaninate hydrochloride (0.16 g, 0.95 mmol, 0.6 eq) in dichloromethane was added dropwise thereto. The thus obtained mixture was stirred for 1.5 hours at −60° C. (1'R, 2'R)-5'-methyl-4-pentyl-2'-(prop-1-en-2-yl)-1',2',3',4'-tetrahydro-[1,1'-biphenyl]-2,6-diol (0.78 g, 1.6 mmol, 1 eq) and triethylamine (0.5 mL, 2.2 eq) were successively added into the reaction solution, then the reaction solution was slowly heated to room temperature, and stirred overnight. The reaction was monitored by LC-MS until the reaction was completed. Saturated solution of ammonium chloride was added at 0° C., and then the thus obtained mixture was extracted with dichloromethane. The organic phase was dried over sodium sulfate and dried using rotary evaporator, and the residue was separated and purified by silica gel column chromatography (petroleum ether/ethyl acetate (v/v) =10:1~1:10) to give the isomer 1-1 (113 mg, with a yield of 33.5%, yellow oil) and isomer 1-2 (64 mg, with a yield of 19.3%, yellow oil) of the titled compound 1, isopropyl ((ethoxycarbonyl)(((1'R,2'R)-6-hydroxy-5'-methyl-4-pentyl-2'-(prop-1-en-2-yl)-1',2',3',4'-tetrahydro-[1,1'-biphenyl]-2-yl)oxy)phosphoryl)-L-alaninate.

Isomer 1-1

$^1$H NMR (300 MHz, Chloroform-d) δ 6.78 (s, 1H), 6.49 (s, 1H), 6.04 (s, 1H), 5.54 (s, 1H), 5.07-4.99 (m, 1H), 4.66 (s, 1H), 4.21 (s, 1H), 4.31-4.08 (m, 3H), 3.84-3.77 (m, 2H), 2.49-2.44 (m, 3H), 2.19-2.11 (m, 1H), 2.04-1.55 (m, 10H), 1.39-1.21 (m, 16H), 0.87 (t, 3H).

$^{31}$P NMR (121 MHz, Chloroform-d): −2.98.

LC-MS m/z (ESI)=564.19 [M+1].

Isomer 1-2

$^1$H NMR (300 MHz, Chloroform-d) δ 6.68 (s, 1H), 6.47 (s, 1H), 6.12 (s, 1H), 5.55 (s, 1H), 5.02-4.94 (m, 1H), 4.52 (s, 1H), 4.35 (s, 1H), 4.28-4.04 (m, 3H), 3.87-3.72 (m, 2H), 2.45-2.40 (m, 3H), 2.19-2.08 (m, 1H), 1.79-1.46 (m, 10H), 1.39-1.21 (m, 16H), 0.84 (t, 3H).

$^{31}$P NMR (121 MHz, Chloroform-d): −3.47.

LC-MS m/z (ESI)=564.20 [M+1].

Example 2

Ethyl((ethoxycarbonyl)(((1'R,2'R)-6-hydroxy-5'-methyl-4-pentyl-2'-(prop-1-en-2-yl)-1',2',3',4'-tetrahydro-[1,1'-biphenyl]-2-yl)oxy)phosphoryl)-L-alaninate (Compound 2)

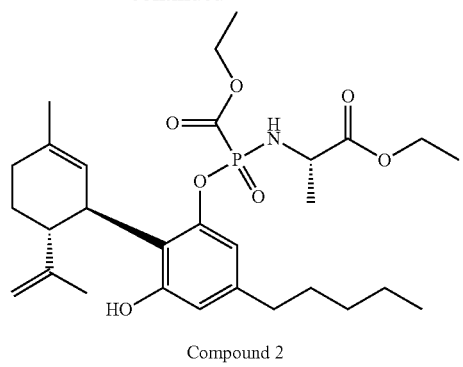

Compound 2

Compound 2 was synthesized and separated by the same method as that of compound 1 to obtain isomer 2-1 (68 mg, with a yield of 8.1%, yellow oil) and isomer 2-2 (77 mg, with a yield of 6.7%, yellow oil) of the titled compound.

Isomer 2-1

$^1$H NMR (300 MHz, Chloroform-d) δ 6.78 (s, 1H), 6.49 (s, 1H), 6.04 (s, 1H), 5.54 (s, 1H), 4.65 (s, 1H), 4.42 (s, 1H), 4.22-4.15 (m, 4H), 3.87-3.84 (m, 1H), 3.79-3.72 (m, 1H), 2.49-2.44 (m, 3H), 2.23-2.04 (m, 2H), 1.82-1.52 (m, 10H), 1.41-1.24 (m, 13H), 0.87 (t, 3H).

$^{31}$P NMR (121 MHz, Chloroform-d): −2.98.

LC-MS m/z (ESI)=550.22 [M+1].

Isomer 2-2

$^1$H NMR (300 MHz, Chloroform-d) δ 6.69 (s, 1H), 6.49 (s, 1H), 6.09 (s, 1H), 5.58 (s, 1H), 4.55 (s, 1H), 4.36 (s, 1H), 4.31-4.10 (m, 4H), 3.87-3.84 (m, 1H), 3.77-3.70 (m, 1H), 2.47-2.42 (m, 3H), 2.20-2.04 (m, 2H), 1.82-1.51 (m, 10H), 1.32-1.22 (m, 13H), 0.86 (t, 3H).

$^{31}$P NMR (121 MHz, Chloroform-d): −3.49.

LC-MS m/z (ESI)=550.20 [M+1].

Example 3

Benzyl((ethoxycarbonyl)(((1'R,2'R)-6-hydroxy-5'-methyl-4-pentyl-2'-(prop-1-en-2-yl)-1',2',3',4'-tetrahydro-[1,1'-biphenyl]-2-yl)oxy)phosphoryl)-L-alaninate (Compound 3)

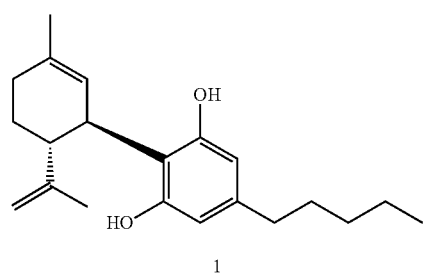

1

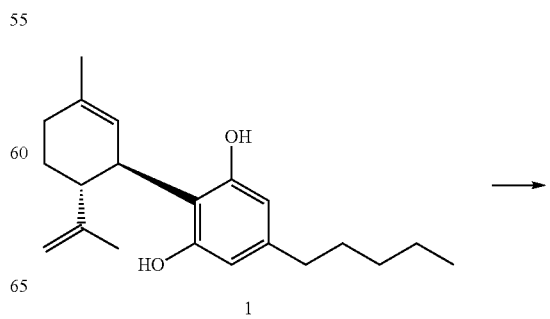

1

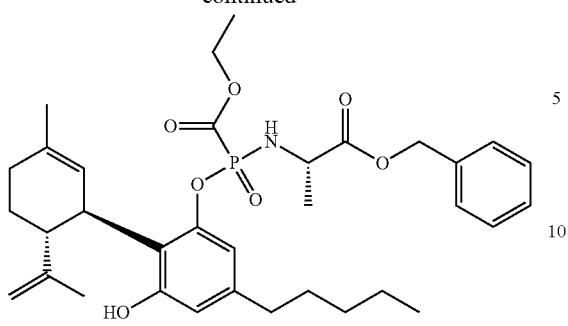

Compound 3

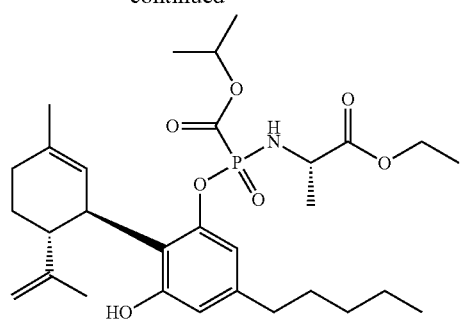

Compound 4

Compound 3 was synthesized and separated by the same method as that of compound 1 to obtain isomer 3-1 (66 mg, with a yield of 5.7%, yellow oil) and isomer 3-2 (76 mg, with a yield of 6.3%, yellow oil) of titled compound 3.

Compound 4 was synthesized and separated by the same method as that of compound 1 to obtain isomer 4-1 (85 mg, with a yield of 7.9%, yellow oil) and isomer 4-2 (129 mg, with a yield of 12%, yellow oil) of titled compound 4.

Isomer 3-1

$^{1}$H NMR (300 MHz, Chloroform-d) δ 7.39-7.29 (m, 5H), 6.78 (s, 1H), 6.49 (s, 1H), 6.04 (s, 1H), 5.53 (s, 1H), 5.21-5.11 (m, 2H), 4.63 (s, 1H), 4.41 (s, 1H), 4.33-4.10 (m, 3H), 3.87-3.74 (m, 2H), 2.46 (t, 3H), 2.22-2.04 (m, 2H), 1.83-1.20 (m, 20H), 0.86 (t, 3H).

$^{31}$P NMR (121 MHz, Chloroform-d): −3.05.

LC-MS m/z (ESI)=612.45 [M+1].

Isomer 4-1

$^{1}$H NMR (300 MHz, Chloroform-d) δ 6.78 (s, 1H), 6.48 (s, 1H), 6.04 (s, 1H), 5.54 (s, 1H), 5.19-5.13 (m, 1H), 4.65 (s, 1H), 4.42 (s, 1H), 4.22-4.14 (m, 4H), 3.87-3.84 (m, 1H), 3.78-3.71 (m, 1H), 2.48-2.43 (m, 3H), 2.22-2.10 (m, 2H), 1.81-1.49 (m, 10H), 1.40-1.1.23 (m, 15H), 0.87 (t, 3H).

$^{31}$P NMR (121 MHz, Chloroform-d): −2.86.

LC-MS m/z (ESI)=564.28 [M+1].

Isomer 3-2

$^{1}$H NMR (300 MHz, Chloroform-d) δ 7.39-7.29 (m, 5H), 6.70 (s, 1H), 6.49 (s, 1H), 6.09 (s, 1H), 5.55 (s, 1H), 5.18-5.09 (m, 2H), 4.54 (s, 1H), 4.36 (s, 1H), 4.27-4.20 (m, 3H), 3.87-3.71 (m, 2H), 2.45 (t, 3H), 2.26-2.10 (m, 2H), 1.83-1.18 (m, 20H), 0.86 (t, 3H).

$^{31}$P NMR (121 MHz, Chloroform-d): −3.61.

LC-MS m/z (ESI)=612.53 [M+1].

Isomer 4-2

$^{1}$H NMR (300 MHz, Chloroform-d) δ 6.70 (s, 1H), 6.48 (s, 1H), 6.07 (s, 1H), 5.58 (s, 1H), 5.17-5.12 (m, 1H), 4.54 (s, 1H), 4.37 (s, 1H), 4.19-4.07 (m, 4H), 3.89-3.86 (m, 1H), 3.75-3.68 (m, 1H), 2.47-2.42 (m, 3H), 2.24-2.05 (m, 2H), 1.79-1.42 (m, 10H), 1.32-1.18 (m, 15H), 0.86 (t, 3H).

$^{31}$P NMR (121 MHz, Chloroform-d): −3.39.

LC-MS m/z (ESI)=564.51 [M+1].

Example 4

Ethyl((((1'R,2'R)-6-hydroxy-5'-methyl-4-pentyl-2'-(prop-1-en-2-yl)-1',2',3',4'-tetrahydro-[1,1'-biphenyl]-2-yl)oxy)(isopropoxycarbonyl)phosphoryl)-L-alaninate (Compound 4)

Example 5

Isopropyl 2-(((ethoxycarbonyl)(((1'R,2'R)-6-hydroxy-5'-methyl-4-pentyl-2'-(prop-1-en-2-yl)-1',2',3',4'-tetrahydro-[1,1'-biphenyl]-2-yl)oxy)phosphoryl)amino)-2-methylpropanoate (Compound 5)

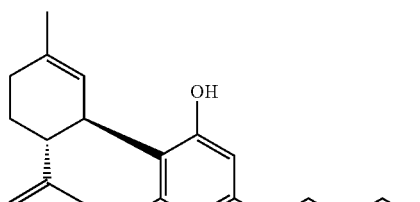

1

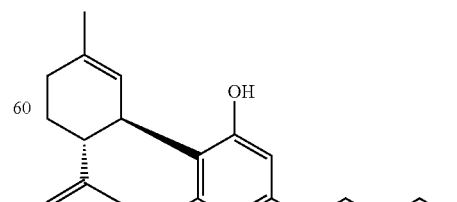

1

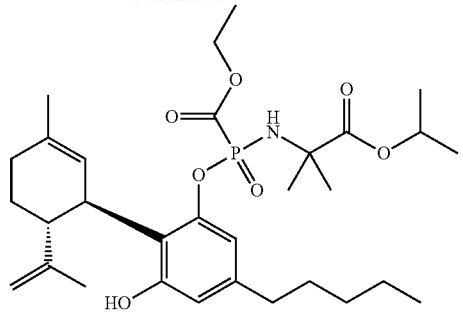

Compound 5

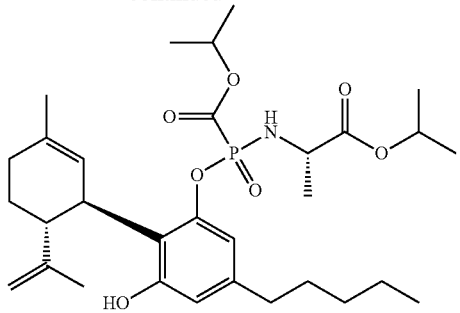

Compound 6

Compound 5 was synthesized and separated by the similar method as that of compound 1 to obtain isomer 5-1 (760 mg, with a yield of 4.4%, white solid) and isomer 5-2 (691 mg, with a yield of 4%, white solid) of titled compound 5.

Compound 6 was synthesized and separated by the same method as that of compound 1 to obtain isomer 6-1 (30 mg, with a yield of 1.8%, yellow oil) and isomer 6-2 (120 mg, with a yield of 7.3%, white solid) of titled compound 6.

Isomer 5-1

$^1$H NMR (300 MHz, Chloroform-d) δ 6.78 (s, 1H), 6.45 (s, 1H), 6.09 (s, 1H), 5.48 (s, 1H), 4.57-3.81 (m, 6H), 2.43-1.95 (m, 5H), 1.72-1.50 (m, 16H), 1.26-1.19 (m, 13H), 0.81 (t, 3H).

$^{31}$P NMR (121 MHz, Chloroform-d): −3.43.

LC-MS m/z (ESI)=578.47 [M+1].

Isomer 6-1

$^1$H NMR (300 MHz, Chloroform-d) δ 6.78 (s, 1H), 6.49 (s, 1H), 6.04 (s, 1H), 5.55 (s, 1H), 5.18-5.01 (m, 2H), 4.66 (s, 1H), 4.42 (s, 1H), 4.19-4.16 (m, 1H), 3.88-3.77 (m, 2H), 2.49-2.44 (m, 3H), 2.21-2.05 (m, 2H), 1.79-1.37 (m, 10H), 1.28-1.19 (m, 19H), 0.87 (t, 3H).

$^{31}$P NMR (121 MHz, Chloroform-d): −2.89.

LC-MS m/z (ESI)=578.05 [M+1].

Isomer 5-2

$^1$H NMR (300 MHz, Chloroform-d) δ 6.69 (s, 1H), 6.43 (s, 1H), 6.01 (s, 1H), 5.47 (s, 1H), 5.00-4.92 (m, 1H), 4.46-3.82 (m, 6H), 2.40-1.97 (m, 5H), 1.70-1.44 (m, 16H), 1.21-1.16 (m, 13H), 0.79 (t, 3H).

$^{31}$P NMR (121 MHz, Chloroform-d): −3.65.

LC-MS m/z (ESI)=578.65 [M+1].

Isomer 6-2

$^1$H NMR (300 MHz, Chloroform-d) δ 6.70 (s, 1H), 6.49 (s, 1H), 6.08 (s, 1H), 5.59 (s, 1H), 5.17-4.99 (m, 2H), 4.55 (s, 1H), 4.37 (s, 1H), 4.12-3.70 (m, 3H), 2.47-2.42 (m, 3H), 2.21-2.04 (m, 2H), 1.81-1.51 (m, 10H), 1.32-1.19 (m, 19H), 0.87 (t, 3H). $^{31}$P NMR (121 MHz, Chloroform-d): −3.38.

LC-MS m/z (ESI)=578.12 [M+1].

Example 6

Isopropyl((((1'R,2'R)-6-hydroxy-5'-methyl-4-pentyl-2'-(prop-1-en-2-yl)-1',2',3',4'-tetrahydro-[1,1'-biphenyl]-2-yl)oxy)(isopropoxycarbonyl)phosphoryl)-L-alaninate (Compound 6)

Example 7

Isopropyl 2-(((((1'R,2'R)-6-hydroxy-5'-methyl-4-pentyl-2'-(prop-1-en-2-yl)-1',2',3',4'-tetrahydro-[1,1'-biphenyl]-2-yl)oxy)(isopropoxycarbonyl)phosphoryl)amino)-2-methylpropanoate (Compound 7)

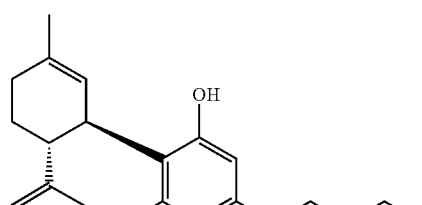

1

→

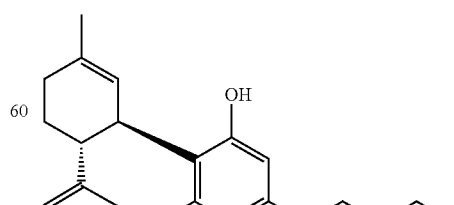

1

→

-continued

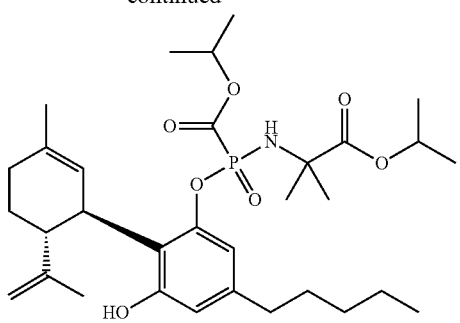

Compound 7

Compound 7 was synthesized and separated by the similar method as that of compound 1 to obtain isomer 7-1 (21 mg, with a yield of 1.2%, yellow oil) and isomer 7-2 (163 mg, with a yield of 9.3%, yellow oil) of titled compound 7.

Isomer 7-1

$^1$H NMR (300 MHz, Chloroform-d) δ 6.81 (s, 1H), 6.46 (s, 1H), 6.04 (s, 1H), 5.53 (s, 1H), 5.18-5.09 (m, 1H), 5.07-4.99 (m, 1H), 4.62 (s, 1H), 4.40 (s, 1H), 4.19 (d, 1H), 3.86 (d, 1H), 2.47-2.42 (m, 3H), 2.21-2.03 (m, 2H), 1.81-1.21 (m, 32H), 0.85 (t, 3H).

$^{31}$P NMR (121 MHz, Chloroform-d): −3.36.

LC-MS m/z (ESI)=592.45 [M+1].

Isomer 7-2

$^1$H NMR (300 MHz, Chloroform-d) δ 6.75 (s, 1H), 6.47 (s, 1H), 6.04 (s, 1H), 5.58 (s, 1H), 5.29-5.12 (m, 1H), 5.06-4.98 (m, 1H), 4.55 (s, 1H), 4.38 (s, 1H), 4.12 (d, 1H), 3.87 (d, 1H), 2.48-2.43 (m, 3H), 2.20-2.04 (m, 2H), 1.83-1.20 (m, 32H), 0.86 (t, 3H).

$^{31}$P NMR (121 MHz, Chloroform-d): −3.39.

LC-MS m/z (ESI)=592.10 [M+1].

Example 8

Ethyl 2-(((ethoxycarbonyl)(((1'R,2'R)-6-hydroxy-5'-methyl-4-pentyl-2'-(prop-1-en-2-yl)-1',2',3',4'-tetrahydro-[1,1'-biphenyl]-2-yl)oxy)phosphoryl)amino)-2-methylpropanoate (Compound 8)

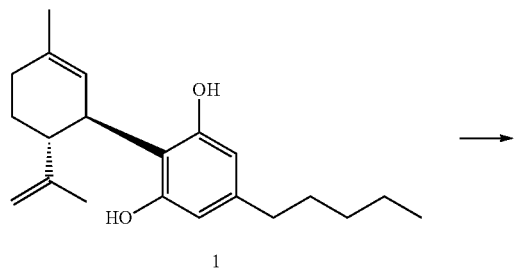

-continued

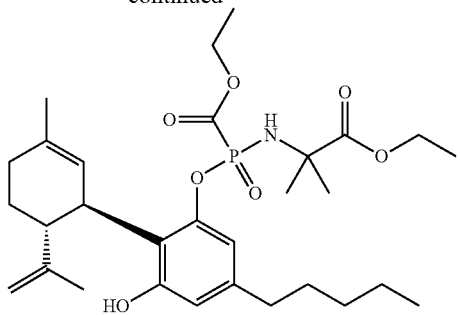

Compound 8

Compound 8 was synthesized and separated by the similar method as that of compound 1 to obtain isomer 8-1 (180 mg, with a yield of 5%, yellow oil) and isomer 8-2 (175 mg, with a yield of 5%, yellow oil) of titled compound 8.

Isomer 8-1

$^1$H NMR (300 MHZ, Chloroform-d) δ 6.81 (s, 1H), 6.47 (s, 1H), 6.06 (s, 1H), 5.53 (s, 1H), 4.61 (s, 1H), 4.39 (s, 1H), 4.30-4.23 (m, 2H), 4.20-4.12 (m, 2H), 3.84 (d, 1H), 2.45 (t, 2H), 2.18 (s, 1H), 2.10-2.03 (m, 1H), 1.77 (s, 1H), 1.68-1.61 (m, 2H), 1.64 (s, 6H), 1.59-1.48 (m, 2H), 1.56 (s, 6H), 1.30-1.24 (m, 6H), 0.85 (t, 3H).

$^{31}$P NMR (121 MHz, Chloroform-d): −3.45.

LC-MS m/z (ESI)−564.40 [M+1].

Isomer 8-2

$^1$H NMR (400 MHZ, Chloroform-d) δ 6.74 (s, 1H), 6.47 (s, 1H), 6.07 (s, 1H), 5.56 (s, 1H), 4.54 (s, 1H), 4.36 (s, 1H), 4.32-4.24 (m, 2H), 4.21-4.02 (m, 2H), 3.84 (d, 12.0 Hz, 1H), 2.44 (t, 2H), 2.19 (s, 1H), 2.10-2.03 (m, 1H), 1.78 (s, 1H), 1.64-1.56 (m, 2H), 1.60 (s, 3H), 1.59 (s, 3H) 1.55-1.47 (m, 2H), 1.49 (s, 6H), 1.32-1.20 (m, 6H), 0.85 (t, 3H).

$^{31}$P NMR (121 MHz, Chloroform-d): −3.56.

LC-MS m/z (ESI)=564.40 [M+1].

Example 9

Isopropyl((ethoxycarbonyl)((6-hydroxy-5'-(methyl-d3)-4-pentyl-2'-(prop-1-en-2-yl)-1',2',3',4'-tetrahydro-[1,1'-biphenyl]-2-yl)oxy)phosphoryl)-L-alaninate (Compound 9)

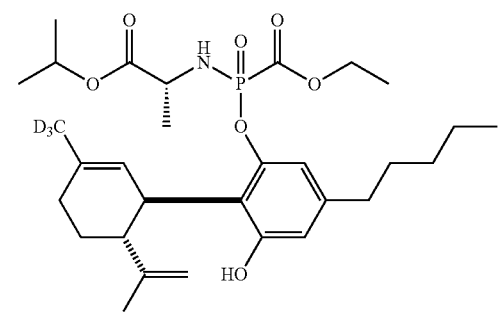

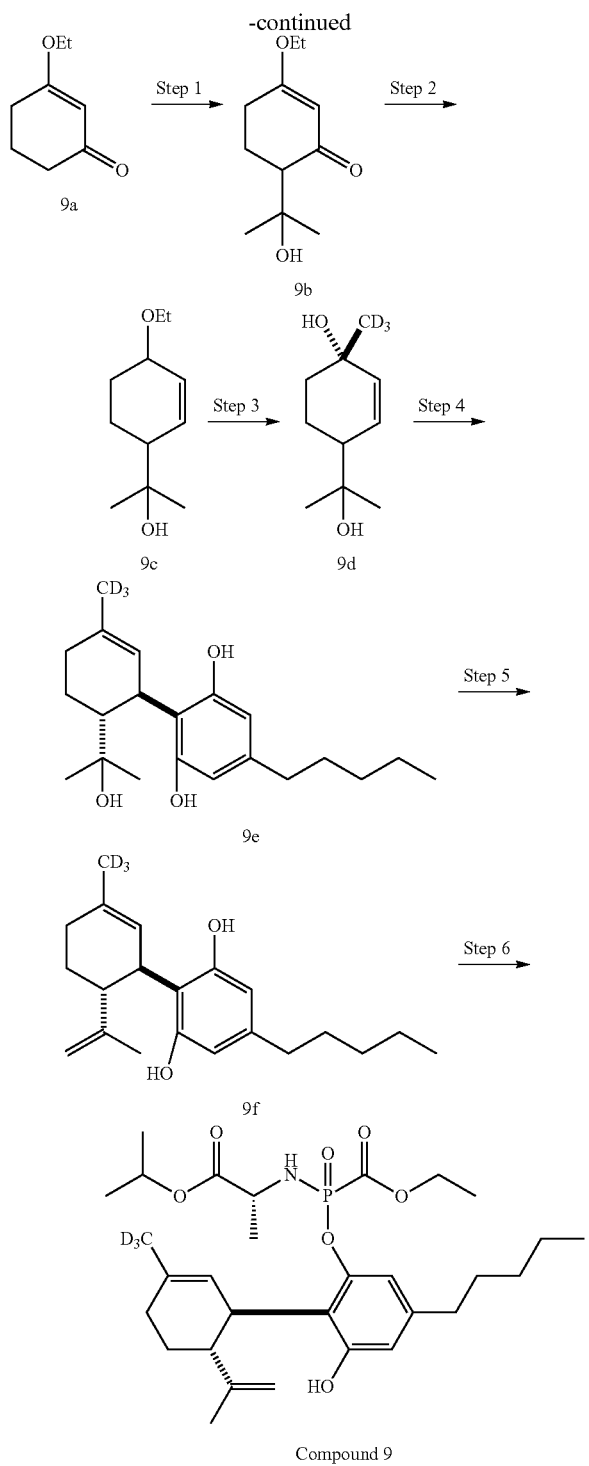

g, 142.0 mmol) was added dropwise thereto, and the thus obtained mixture was stirred for 3 hours after the addition was completed. TLC test was used to monitor the reaction until the reaction was completed. Saturated solution of ammonium chloride (180 mL) was added dropwise to quench the reaction, and the reaction solution was separated. The aqueous phase was extracted with ethyl acetate (150 mL×2). The organic phase was combined and washed with saturated brine (100 mL), dried over anhydrous sodium sulfate, and filtered. The filtrate was concentrated under vacuum to obtain the titled compound 9b (yellow oil, 18.0 g, with a yield of 99.0%).

$^1$H NMR (400 MHz, DMSO). δ 5.29 (s, 1H), 4.93 (s, 1H), 3.98-3.87 (m, 2H), 2.46 (dd, J=11.2, 5.0 Hz, 1H), 2.37 (dt, J=17.4, 4.5 Hz, 1H), 2.21 (dd, J=12.1, 4.7 Hz, 1H), 2.12-2.03 (m, 1H), 1.67 (ddd, J=24.2, 12.3, 5.1 Hz, 1H), 1.27 (t, J=7.0 Hz, 3H), 0.99 (s, 3H), 0.73 (s, 3H).

LC-MS m/z (ESI)=199.21 [M+1].

Step 2

4-(2-hydroxypropan-2-yl)cyclohex-2-en-1-one 9c

Under nitrogen atmosphere, red aluminum (67 mL, 234.1 mmol, 3.5 N) was added dropwise to the compound 9b (17.0 g, 78.0 mmol) in tetrahydrofuran (200 mL) at 0° C., and after the addition was completed, the mixture was slowly heated to room temperature and stirred for 2 hours. TLC test was used to monitor the reaction until the reaction was completed. The thus obtained mixture was cooled to 0° C., quenched by dropwise adding saturated solution of ammonium chloride (13 mL), and filtered by suction. The aqueous phase was extracted with ethyl acetate (200 mL×2). The organic phase was combined, washed with saturated brine solution (100 mL), dried over anhydrous sodium sulfate and filtered. The filtrated was concentrated under vacuum to obtain crude product, then the crude product was dissolved in tetrahydrofuran (40 mL), hydrochloric acid aqueous solution (40 mL, 2 N) was added dropwise thereto and the thus obtained mixture was stirred at room temperature for 1.5 hours after the addition was completed. TLC test was used to monitor the reaction until the reaction was completed. The reaction was quenched by dropwise adding saturated solution of sodium bicarbonate. The thus obtained mixture was concentrated under vacuum, the aqueous phase was extracted with ethyl acetate (100 mL×4), and the combined organic phases were washed with saturated brine (100 mL), dried over anhydrous sodium sulfate, and filtered. The filtrate was concentrated under vacuum and the residue was purified by silica gel column chromatography (eluent: ethyl acetate/petroleum ether (v/v)=⅓) to obtain the titled compound 9c (colorless oil, 5.8 g, with a yield of 48.0%).

$^1$H NMR (400 MHz, DMSO) δ 7.19 (dt, J=10.4, 1.9 Hz, 1H), 5.93 (dd, J=10.4, 2.8 Hz, 1H), 4.58 (s, 1H), 2.44-2.38 (m, 1H), 2.38-2.29 (m, 2H), 2.08-1.96 (m, 1H), 1.62 (tdd, J=12.9, 9.4, 5.0 Hz, 1H), 0.99 (s, 3H), 0.73 (s, 3H).

LC-MS m/z (ESI)=155.40 [M+1].

Step 3

4-(2-hydroxypropan-2-yl)-1-(methyl-d3)cyclohex-2-en-1-ol 9d

Under nitrogen atmosphere, deuterated methyl magnesium iodide (34 mL, 33.7 mmol, 1.0 N) was added dropwise to anhydrous lithium chloride (1.4 g, 33.7 mmol) in tetrahydrofuran (20 mL) at 0° C. and the thus obtained mixture Step 1

3-ethoxy-6-(2-hydroxypropan-2-yl)cyclohex-2-en-1-one 9b

Under nitrogen atmosphere, 3-ethoxycyclohex-2-en-1-one 9a (10.0 g, 71.0 mmol) was added dropwise to lithium diisopropylamide (54 mL, 107.0 mmol, 2.0 N) in tetrahydrofuran (100 mL) at −70° C., and the mixture was stirred for 0.5 h after the addition was completed. Then acetone (9.2 was stirred for 0.5 hour after the addition was completed. Then compound 9c (1.8 g, 11.2 mmol) in tetrahydrofuran (5 mL) was added dropwise thereto and the mixture was stirred for 0.5 hour after the addition was completed. TLC test was used to monitor the reaction until the reaction was completed. Saturated solution of ammonium chloride (20 mL) was added dropwise to quench the reaction. The aqueous phase was extracted with ethyl acetate (50 mL×3) and the combined organic phases were washed with saturated brine (50 mL), dried over anhydrous sodium sulfate, and filtered. The filtrate was concentrated under vacuum to obtain a crude product, which was purified by silica gel column chromatography (eluent: ethyl acetate/petroleum ether (v/v)= 2/1) to obtain the titled compound 9d (white solid, 1.2 g, yield: 60.0%).

$^1$H NMR (400 MHz, DMSO) δ 5.61 (d, J=10.4 Hz, 1H), 5.52 (d, J=10.6 Hz, 1H), 4.38 (s, 1H), 4.17 (s, 1H), 2.00 (ddd, J=10.8, 5.1, 2.4 Hz, 1H), 1.73-1.65 (m, 2H), 1.57-1.48 (m, 1H), 1.21 (dd, J=10.1, 6.8 Hz, 1H), 0.99 (s, 3H), 0.73 (s, 3H).

LC-MS m/z (ESI)=174.62 [M+1].

Step 4

2'-(2-hydroxypropan-2-yl)-5'-(methyl-d3)-4-pentyl-1',2',3',4'-tetrahydro-[1,1'-biphenyl]-2,6-diol 9e 4-(2-hydroxypropyl-2-yl)-1-(methyl-d3) cyclohex-2-ene-1-ol 9d (2.37 g, 13.7 mmol), 3,5-dihydroxyamylbenzene (3.7 g, 20.6 mmol) and 4 A molecular sieve (6 g) were dissolved in 30 mL of dichloromethane, the atmosphere in the flask was replaced by nitrogen and the thus obtained mixture was stirred for 20 minutes. Then L-camphor sulfonic acid (317.8 mg, 1.37 mmol) was added thereto. The thus obtained mixture was stirred for 1 hour at room temperature. The reaction was quenched by adding 60 mL of saturated aqueous solution of sodium bicarbonate, and then extracted with ethyl acetate (30 mL×4). The organic phases were combined, dried over anhydrous sodium sulfate, and filtered. The filtrate was concentrated to obtain a crude product, which was purified by silica gel column chromatography (eluent: ethyl acetate/petroleum ether (v/v)=⅙) to obtain the titled compound 9e (colorless oil, 1.3 g, with a yield of 28.5%).

$^1$H NMR (400 MHz, DMSO) δ 9.04-8.43 (m, 2H), 6.03 (s, 2H), 4.89 (s, 1H), 3.66 (m, 2H), 2.32 (m, 3H), 2.14-2.06 (m, 1H), 2.02 (m, 1H), 1.88-1.79 (m, 1H), 1.47 (m, 2H), 1.32-1.19 (m, 5H), 0.97 (s, 3H), 0.85 (t, 3H), 0.80 (s, 3H).

LC-MS m/z (ESI)=336.20 [M+1].

Step 5

5'-(methyl-d3)-4-pentyl-2'-(prop-1-en-2-yl)-1',2',3',4'-tetrahydro-[1,1'-biphenyl]-2,6-diol 9f At 0° C., compound 9e (1.3 g, 3.9 mmol), Burgess reagent (1.1 g, 4.7 mmol) and tetrahydrofuran (10 mL) were successively added into the reaction flask, and the thus the obtained mixture was stirred for 3 hours under nitrogen atmosphere. TLC test was used to monitor the reaction until the reaction was completed. Ethyl acetate (50 mL) was added to the reaction solution, the thus obtained organic phase was washed with saturated brine (40 mL), dried over anhydrous sodium sulfate, and filtered. The filtrate was concentrated under vacuum to obtain a crude product, which was purified by silica gel column chromatography (eluent: ethyl acetate/petroleum ether (v/v)=1/15) to obtain the titled compound 9f (colorless oil, 794 mg, with a yield of 64.0%).

$^1$H NMR (400 MHz, DMSO) δ 8.65 (s, 2H), 6.01 (s, 2H), 5.08 (s, 1H), 4.49 (d, 1H), 4.43-4.37 (d, 1H), 3.85-3.78 (m, 1H), 3.08-2.98 (m, 1H), 2.32-2.26 (m, 2H), 2.13-2.04 (m, 1H), 1.95-1.87 (m, 1H), 1.71-1.63 (m, 1H), 1.58 (s, 3H), 1.47 (m, 2H), 1.35-1.22 (m, 5H), 0.86 (t, 3H).

LC-MS m/z (ESI)=318.20 [M+1].

Step 6

Isopropyl((ethoxycarbonyl)((6-hydroxy-5'-(methyl-d3)-4-pentyl-2'-(prop-1-en-2-yl)-1',2',3',4'-tetrahydro-[1,1'-biphenyl]-2-yl)oxy)phosphoryl)-L-alaninate (Compound 9)

The titled compound 9 (69 mg, with a yield of 23%, yellow oil) was prepared by the same method as that of compound 1.

LC-MS m/z (ESI)=567.39 [M+1].

The following intermediates were synthesized according to the method indicated in the table.

| No. | Preparation method | Structural formula |
|---|---|---|
| Intermediate 10 | Intermediate 10 was prepared with reference to Org. Lett., 2000, 2, 3301-330. | |
| Intermediate 11 | Intermediate 11 was prepared with refererence to WO2011006099. | |

-continued

| No. | Preparation method | Structural formula |
|---|---|---|
| Intermediate 12 | Intermediate 12 was prepared with refererence to Org. Lett., 2000, 2, 3301-330 and WO2011006099. | 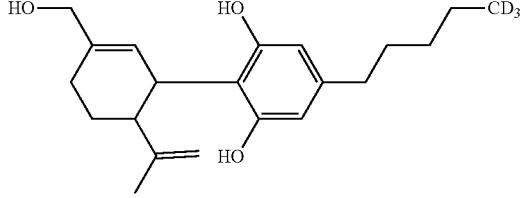 [SMILES: [2H]C([2H])([2H])CCCCc1cc(O)c(C2C=C(CO)CCC2C(=C)C)c(O)c1] |
| Intermediate 13 | Intermediate 13 was prepared with refererence to WO2011006099. | 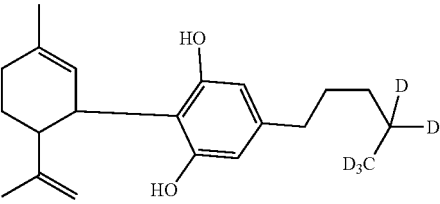 [SMILES: [2H]C([2H])([2H])C([2H])([2H])CCCc1cc(O)c(C2C=C(C)CCC2C(=C)C)c(O)c1] |
| Intermediate 14 | Intermediate 14 was prepared with refererence to Org. Lett., 2000, 2, 3301-330 and WO2011006099. | 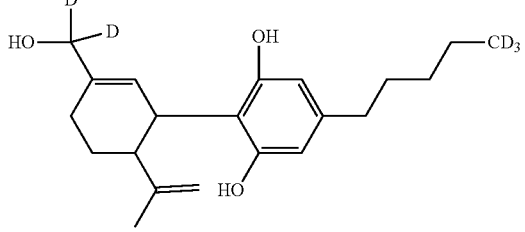 |
| Intermediate 15 | Intermediate 15 was prepared with refererence to Org. Lett., 2000, 2, 3301-330. | 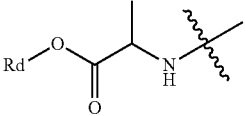 |
| Intermediate 16 | Intermediate 16 was prepared with reference to WO2011006099. | 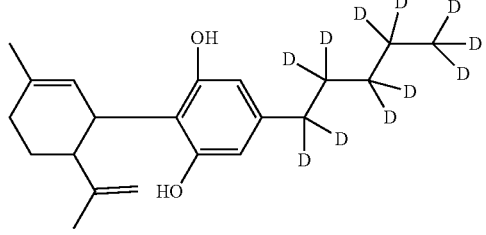 |
| Intermediate 17 | Intermediate 17 was prepared with refererence to WO2011006099. | 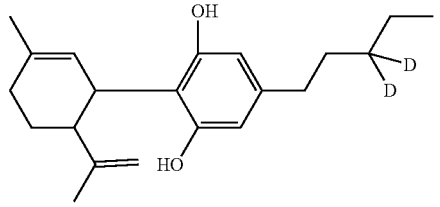 [SMILES: [2H]C([2H])(CC)CCc1cc(O)c(C2C=C(C)CCC2C(=C)C)c(O)c1] |
| Intermediate 18 | Intermediate 18 was prepared with reference to WO2011006099. | 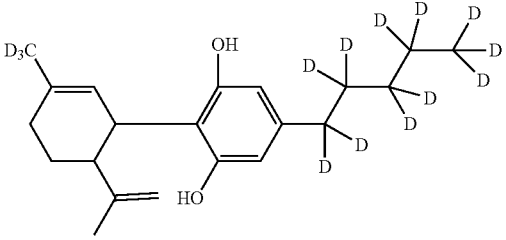 [SMILES: [2H]C([2H])([2H])C1=CC(c2c(O)cc(C([2H])([2H])C([2H])([2H])C([2H])([2H])C([2H])([2H])C([2H])([2H])[2H])cc2O)C(C(=C)C)CC1] |

-continued

| No. | Preparation method | Structural formula |
|---|---|---|
| Intermediate 19 | Intermediate 19 was prepared with reference to WO2011006099. | 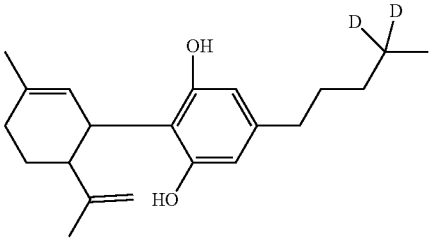 [SMILES: [2H]C([2H])(C)CCCc1cc(O)c(C2C=C(C)CCC2C(=C)C)c(O)c1] |
| Intermediate 20 | Intermediate 20 was prepared with reference to WO2011006099. | 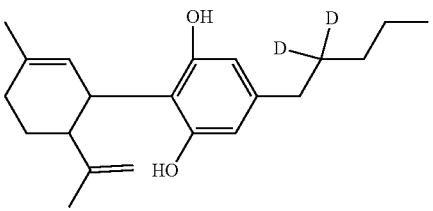 [SMILES: [2H]C([2H])(CCC)Cc1cc(O)c(C2C=C(C)CCC2C(=C)C)c(O)c1] |
| Intermediate 21 | Intermediate 21 was prepared with reference to WO2011006099. | 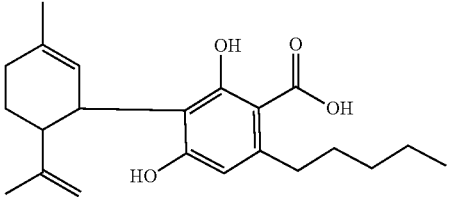 [SMILES: C=C(C)C1CCC(C)=CC1c1c(O)cc(CCCCC)c(C(=O)O)c1O] |
| Intermediate 22 | Intermediate 22 was prepared with refererence to Org. Lett., 2008, 10, 2195-2198. | 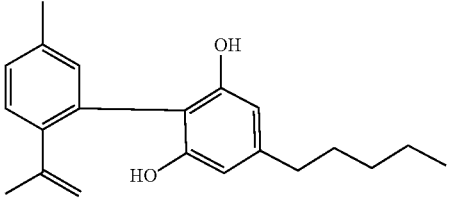 [SMILES: C=C(C)c1ccc(C)cc1-c1c(O)cc(CCCCC)cc1O] |
| Intermediate 23 | Intermediate 23 was prepared with refererence to Org. Lett., 2008, 10, 2195-2198 and WO2019033164. | 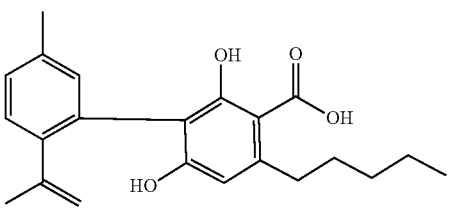 [SMILES: C=C(C)c1ccc(C)cc1-c1c(O)cc(CCCCC)c(C(=O)O)c1O] |
| Intermediate 24 | Intermediate 24 was prepared with reference to WO2017008136. | 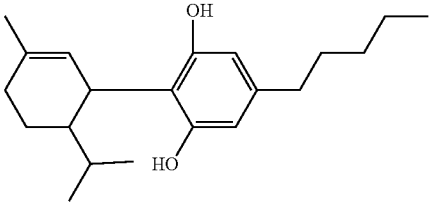 [SMILES: CCCCCc1cc(O)c(C2C=C(C)CCC2C(C)C)c(O)c1] |
| Intermediate 25 | Intermediate 25 was prepared with reference to WO2017008136. | 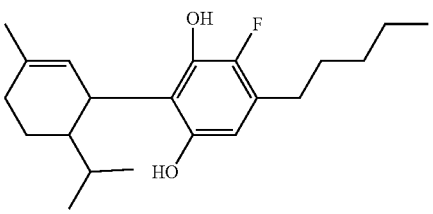 [SMILES: CCCCCc1cc(O)c(C2C=C(C)CCC2C(C)C)c(O)c1F] |

-continued

| No. | Preparation method | Structural formula |
|---|---|---|
| Intermediate 26 | Intermediate 26 was prepared with reference to WO2017008136. | |
| Intermediate 27 | Intermediate 27 was prepared with reference to Org. Lett., 2008, 10, 2195-2198 and WO2017008136. | |

The following compounds were prepared using the same method as that of compound 1.

| No. | Structural formula | [M + H]+ |
|---|---|---|
| Compound 10 | | 580.34 |
| Compound 11 | | 567.39 |
| Compound 12 | | 583.37 |

-continued

| No. | Structural formula | [M + H]+ |
|---|---|---|
| Compound 13 | | 569.29 |
| Compound 14 | | 585.38 |
| Compound 15 | | 582.30 |
| Compound 16 | | 575.41 |
| Compound 17 | | 566.35 |

| No. | Structural formula | [M + H]+ |
|---|---|---|
| Compound 18 | | 578.44 |
| Compound 19 | | 566.28 |
| Compound 20 | | 566.33 |
| Compound 21 | | 608.32 |
| Compound 22 | | 560.22 |

-continued

| No. | Structural formula | [M + H]+ |
|---|---|---|
| Compound 23 | | 604.26 |
| Compound 24 | | 566.37 |
| Compound 25 | | 584.30 |
| Compound 26 | | 582.28 |
| Compound 27 | | 562.32 |

Pharmacokinetics in Rats

Healthy adult SD rats (n=3 per group) were fasted overnight (free access to water), and then were administrated the drugs by intragastric administration (i.g.) (50 mg/kg). 0.1 mL of blood was collected from jugular plexus of the rats at 30 minute, 1 hour and 8 hour after administration. All blood samples were anticoagulated with $K_2EDTA$, then centrifuged at 3500 rpm at 5° C. for 10 minutes to separate plasma, and stored at −20° C. for test. Parent drug concentration in plasma was determined by LC/MS/MS method.

Using the above method, the blood drug concentrations (ng/mL) of the parent drugs of the compounds at each time point in the rats were measured, the results are as follows:

| No. | Administration dose | Parent drug | 30 min | 1 h | 8 h |
|---|---|---|---|---|---|
| Compound 1 | 50 mg/kg | CBD | 1408 | 1754 | 151.7 |
| Compound 3 | 50 mg/kg | CBD | 1376 | 1604 | 145.9 |
| Compound 5 | 50 mg/kg | CBD | 1388 | 1653 | 160.8 |
| Compound 9 | 50 mg/kg | 9f | 1577 | 1993 | 260.5 |
| Compound 10 | 50 mg/kg | Intermediate 10 | 1409 | 1846 | 164.9 |
| Compound 11 | 50 mg/kg | Intermediate 11 | 1570 | 1982 | 248.3 |
| Compound 12 | 50 mg/kg | Intermediate 12 | 1593 | 2027 | 271.1 |
| Compound 13 | 50 mg/kg | Intermediate 13 | 1568 | 1981 | 260.9 |
| Compound 14 | 50 mg/kg | Intermediate 14 | 1674 | 2070 | 264.6 |
| Compound 18 | 50 mg/kg | Intermediate 18 | 1775 | 2280 | 299.1 |
| Compound 22 | 50 mg/kg | Intermediate 22 | 1401 | 1682 | 143.0 |
| Compound 24 | 50 mg/kg | Intermediate 24 | 1383 | 1691 | 170.2 |
| Compound 25 | 50 mg/kg | Intermediate 25 | 1566 | 1940 | 242.2 |
| Compound 26 | 50 mg/kg | Intermediate 26 | 1559 | 1969 | 268.3 |
| Compound 27 | 50 mg/kg | Intermediate 27 | 1402 | 1675 | 144.9 |

Experiment results showed that the parent drugs can respectively be detected in plasma after intragastric administration of the compounds of the present application, which indicates that the compounds of the present application can be absorbed orally, the compounds can be quickly converted into the parent drugs in vivo, and they show better oral bioavailability than the parent drugs.

Although the specific embodiments are described in detail in the description of the present application, those skilled in the art should realize that the above embodiments are exemplary and cannot be understood as limitations to the present application. If those skilled in the art make improvements and modifications to the present application without departing from the principle of the present application, the technical solutions obtained by these improvements and modifications shall also fall within the protection scope of the claims of the present application.

The invention claimed is:

1. A compound represented by general formula (I), or stereoisomer, solvate, metabolite, pharmaceutically acceptable salt or cocrystal thereof:

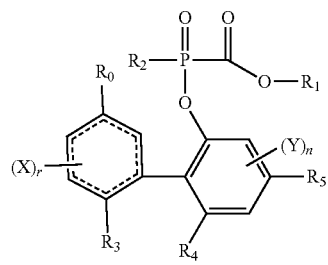

(I)

wherein:
X is selected from the group consisting of hydrogen, hydroxyl, $C_{1-6}$ alkyl and halogen;
Y is selected from the group consisting of hydrogen, carboxylic acid, $C_{1-6}$ alkyl and halogen;
r is selected from the group consisting of 0, 1, 2 and 3;
n is selected from the group consisting of 0, 1 and 2;
$R_0$ is selected from the group consisting of methyl, $C_{3-8}$ carbocyclic group, $-CH_2OH$, $-C(=O)OC_{1-6}$ alkyl, $-C(=O)NR^{b1}R^{b2}$ and carboxyl;
$R_1$ is selected from the group consisting of $C_{1-6}$ alkyl optionally further substituted with 0 to 3 halogen atoms;
$R_2$ is

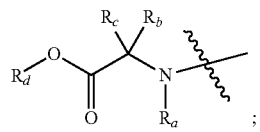

$R_a$ is selected from the group consisting of H and $C_{1-6}$ alkyl;
$R_b$ and $R_c$ are each independently selected from the group consisting of H, $C_{1-6}$ alkyl, amino acid side chain, $-C_{1-6}$ alkylene-$C_{3-12}$ carbocyclic ring and $-C_{1-6}$ alkylene-$C_{3-12}$ heterocyclic ring; wherein, the $C_{3-12}$ heterocyclic ring contains 1 to 4 heteroatoms selected from the group consisting of N, O and S; the $C_{1-6}$ alkylene, the $C_{1-6}$ alkyl, the $C_{3-12}$ carbocyclic ring or the $C_{3-12}$ heterocyclic ring is optionally substituted with 0 to 3 substituents selected from the group consisting of hydroxyl, carboxyl, halogen, cyano, =O, $C_{1-6}$ alkyl, $C_{1-6}$ heteroalkyl, $C_{2-6}$ alkenyl, $C_{2-6}$ alkynyl, $-NR^{b1}R^{b2}$, $-C(=O)OC_{1-6}$ alkyl, $-C(=O)NR^{b1}R^{b2}$, $C_{3-12}$ cycloalkyl, $C_{3-12}$ heterocylcloalkyl, $C_{6-12}$ aryl and $C_{5-12}$ heteroaryl; and as substituents, the $C_{1-6}$ alkyl, the $C_{1-6}$ heteroalkyl, the $C_{2-6}$ alkenyl or the $C_{2-6}$ alkynyl is optionally substituted with one or more substituents selected from the group consisting of hydroxyl, carboxyl, cyano, halogen, —O—$R^{b1}$, —$NR^{b1}R^{b2}$, $C_{3-12}$ cycloalkyl, $C_{3-12}$ heterocycloalkyl, $C_{6-12}$ aryl and $C_{5-12}$ heteroaryl; when the amino acid side chain contains hydroxyl, mercapto or carboxyl, the hydroxyl, the mercapto or the carboxyl is optionally esterified;

$R^{b1}$ and $R^{b2}$ are each independently selected from the group consisting of H, $C_{1-6}$ alkyl, —C(=O)$R^{b3}$ and —C(=O)$NR^{b4}R^{b5}$, wherein the $C_{1-6}$ alkyl is optionally further substituted with one or more substituents selected from the group consisting of hydroxyl, halogen, $C_{1-6}$ alkyl, $C_{1-6}$ alkoxy, $C_{6-12}$ aryl, $C_{5-12}$ heteroaryl, $C_{3-12}$ cycloalkyl and $C_{3-12}$ heterocycloalkyl;

$R^{b3}$ is selected from the group consisting of $C_{1-6}$ alkyl, $C_{1-6}$ alkoxy and $C_{6-12}$ aryl;

$R^{b4}$ and $R^{b5}$ are each independently selected from the group consisting of H and $C_{1-6}$ alkyl; or $R^{b4}$ and $R^{b5}$ together with N atom form a 3 to 12 membered heterocyclic ring containing 1 to 4 heteroatoms selected from the group consisting of N, O and S;

or, $R^b$ and $R^c$ together with the atom to which they are attached form a 3 to 6 membered carbocyclic ring or a 3 to 6 membered heterocyclic ring, wherein the 3 to 6 membered carbocyclic ring or the 3 to 6 membered heterocyclic ring is optionally further substituted with 0 to 3 substituents selected from the group consisting of F, Cl, Br, I, hydroxyl, carboxyl and amino, wherein the 3 to 6 membered heterocyclic ring contains 1 to 4 heteroatoms selected from the group consisting of N, O and S;

$R^d$ is selected from the group consisting of $C_{1-6}$ alkyl, $C_{2-6}$ alkenyl, $C_{2-6}$ alkynyl, $C_{3-10}$ carbocyclic ring, 3 to 10 membered heterocyclic ring, —$C_{1-6}$ alkylene-$C_{3-10}$ carbocyclic ring, —$C_{1-6}$ alkylene-3 to 10 membered carbocyclic ring, —$C_{1-6}$ alkylene-O—$C_{1-6}$ alkylene-$C_{3-10}$ carbocyclic ring, —$C_{1-6}$ alkylene-O—$C_{1-6}$ alkylene-3 to 10 membered heterocyclic ring and —$C_{1-6}$ alkylene-O—$C_{1-4}$ alkyl, wherein the $C_{1-6}$ alkylene, the $C_{2-6}$ alkenyl, the $C_{2-6}$ alkynyl, the $C_{1-6}$ alkyl, the $C_{3-10}$ carbocyclic ring or the 3 to 10 membered heterocyclic ring is optionally further substituted with 0 to 4 substituents selected from the group consisting of H, F, Cl, Br, I, hydroxyl, carboxyl, amino, 1-cyclopropyl ethyl, $C_{1-4}$ alkyl, $C_{1-4}$ alkoxy, —OC(=O)$OR_{d1}$ and —OC(=O)$OR_{d2}$, wherein the 3 to 10 membered heterocyclic ring contains 1 to 6 heteroatoms selected from the group consisting of N, O and S;

$R_{d1}$ and $R_{d2}$ are each independently selected from the group consisting of $C_{1-4}$ alkyl, $C_{3-10}$ carbocyclic ring and 3 to 10 membered heterocyclic ring, wherein the $C_{1-4}$ alkyl, the $C_{3-10}$ carbocyclic ring or the 3 to 10 membered heterocyclic ring is optionally further substituted with 0 to 4 substituents selected from the group consisting of H, F, Cl, Br, I, hydroxyl, carboxyl, $C_{1-4}$ alkyl, $C_{1-4}$ alkoxy, $C_{3-10}$ carbocyclic ring and 3 to 10 membered heterocyclic ring, wherein the 3 to 10 membered heterocyclic ring contains 1 to 6 heteroatoms selected from the group consisting of N, O and S;

$R_3$ is selected from the group consisting of $C_{1-6}$ alkyl, $C_{3-8}$ carbocyclic group and $C_{2-6}$ alkenyl, wherein the $C_{1-6}$ alkyl, the $C_{2-6}$ alkenyl or the $C_{3-8}$ carbocyclic group is optionally further substituted with 0 to 3 substituents selected from the group consisting of halogen, $C_{3-8}$ carbocyclic group and hydroxyl and $C_{1-6}$ alkyl;

$R_4$ is selected from the group consisting of H, hydroxyl, $C_{1-6}$ alkoxy, —C(=O)$OR_{d1}$, —C(=O)$R_{d1}$, —C(=O)C(NH$_2$)—R and

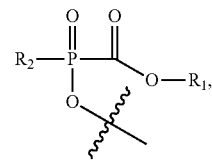

wherein the amino in —C(=O)CH(NH$_2$)—R optionally forms a polypeptide chain with an amino acid;

R is selected from the group consisting of amino acid side chain; when the amino acid side chain contains hydroxyl, mercapto and carboxyl, the hydroxyl, the mercapto or the carboxyl is optionally esterified;

$R_5$ is selected from the group consisting of $C_{1-12}$ alkyl, $C_{1-12}$ heteroalkyl, $C_{2-12}$ alkenyl, $C_{2-12}$ alkynyl, $C_{3-12}$ carbocyclic group, $C_{3-12}$ heterocyclic group, —$C_{1-6}$ alkylene-$C_{3-12}$ carbocyclic group, —$C_{1-6}$ alkylene-$C_{3-12}$ heterocyclic group, —$NR^{b1}R^{b2}$, —$C_{1-6}$ alkylene-C(=O) O$C_{1-6}$ alkyl and —$C_{1-6}$ alkylene-C(=O)$NR^{b1}R^{b2}$, wherein the $C_{1-12}$ alkyl, the $C_{1-12}$ heteroalkyl, the $C_{2-12}$ alkenyl, the $C_{2-12}$ alkynyl, the $C_{1-6}$ alkylene, the $C_{3-12}$ carbocyclic group or the $C_{3-12}$ heterocyclic group is optionally substituted with one or more substituents selected from the group consisting of hydroxyl, carboxyl, halogen, cyano, =O, $C_{1-6}$ alkyl, —$NR^{b1}R^{b2}$, $C_{3-12}$ carbocyclic group, $C_{3-12}$ heterocyclic group, $C_{2-6}$ alkenyl, $C_{2-6}$ alkynyl, —C(=O) O$C_{1-6}$ alkyl, —C(=O) $C_{1-6}$ alkyl, —C(=O)$NR^{b1}R^{b2}$, —S(=O) $C_{1-6}$ alkyl and —S(=O)$_2C_{1-6}$ alkyl, wherein as substituents, the $C_{1-6}$ alkyl, the $C_{3-12}$ carbocyclic group or the $C_{3-12}$ heterocyclic group is further substituted with one or more substituents selected from the group consisting of =O, hydroxyl, carboxyl, halogen, cyano, —C(=O)O$C_{1-6}$ alkyl and —C(=O)$C_{1-6}$ alkyl;

=== is a single bond or a double bond; and;

the general formula (I) is optionally substituted with one or more D atoms.

2. The compound, or stereoisomer, solvate, pharmaceutically acceptable salt or cocrystal thereof according to claim 1, wherein the compound is represented by general formula (II):

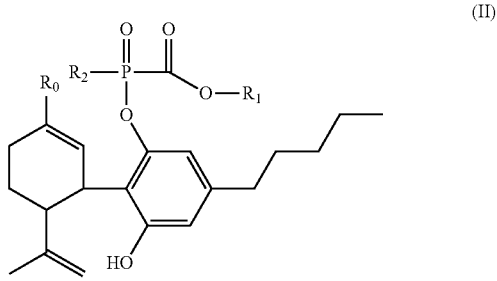

(II)

49 wherein,
R₀ is selected from the group consisting of methyl and —CH₂OH;
R₁ is C₁₋₆ alkyl;
R₂ is

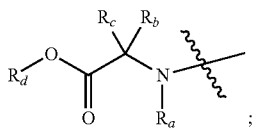

;

$R_a$ is H;
$R_b$ and $R_c$ are each independently selected from the group consisting of H and amino acid side chain; and when the amino acid side chain contains hydroxyl, mercapto or carboxyl, the hydroxyl, the mercapto or the carboxyl is optionally esterified;
$R_d$ is selected from the group consisting of $C_{1-6}$ alkyl, $C_{3-10}$ carbocyclic ring and 3 to 10 membered heterocyclic ring, wherein the $C_{1-6}$ alkyl, the $C_{3-10}$ carbocyclic ring or the 3 to 10 membered heterocyclic ring is optionally further substituted with 0 to 4 substituents selected from the group consisting of H, F, Cl, Br, I, hydroxyl, carboxyl, amino, 1-cyclopropylethyl, $C_{1-4}$ alkyl, $C_{1-4}$ alkoxy, —OC(=O)OR$_{d1}$ and —OC(=O)R$_{d2}$, and the 3 to 10 membered heterocyclic ring contains 1 to 6 heteroatoms selected from the group consisting of N, O and S;
$R_{d1}$ and $R_{d2}$ are each independently $C_{1-4}$ alkyl; and,
the general formula (II) is optionally substituted with one or more D atoms.

3. The compound, or stereoisomer, solvate, pharmaceutically acceptable salt or cocrystal thereof according to claim 2, wherein the compound is represented by general formula (III):

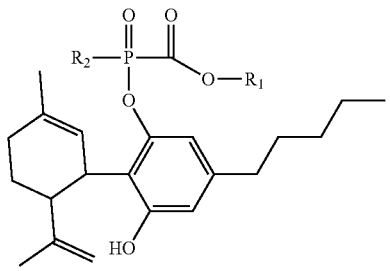

(III)

wherein,
R₁ is C₁₋₆ alkyl;
R₂ is

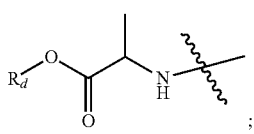

;

$R_d$ is selected from the group consisting of $C_{1-6}$ alkyl, $C_{3-10}$ carbocyclic ring and 3 to 10 membered heterocyclic ring, wherein the $C_{1-6}$ alkyl, the $C_{3-10}$ carbocyclic ring or the 3 to 10 membered heterocyclic ring is optionally further substituted with 0 to 4 substituents selected from the group consisting of H, F, Cl, Br, I, hydroxyl, carboxyl, amino, 1-cyclopropylethyl, $C_{1-4}$ alkyl, $C_{1-4}$ alkoxy, —OC(=O)OR$_{d1}$ and —OC(=O)R$_{d2}$, and the 3 to 10 membered heterocyclic ring contains 1 to 6 heteroatoms selected from the group consisting of N, O and S;
$R_{d1}$ and $R_{d2}$ are each independently $C_{1-4}$ alkyl; and,
the general formula (III) is optionally substituted with one or more D atoms.

4. The compound, or stereoisomer, solvate, pharmaceutically acceptable salt or cocrystals thereof according to claim 1, wherein the compound has one of the following structures:

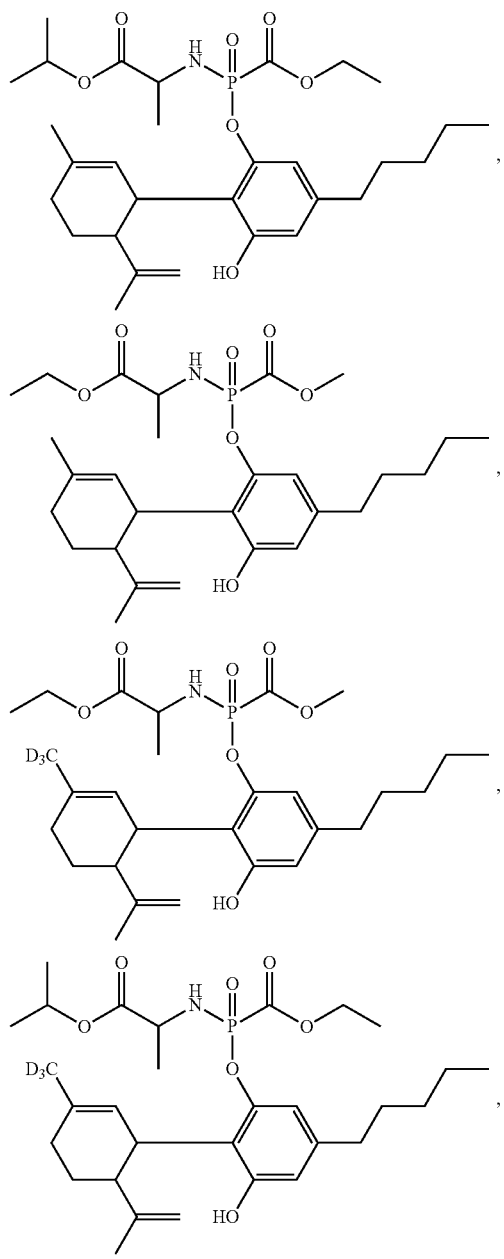

51
-continued
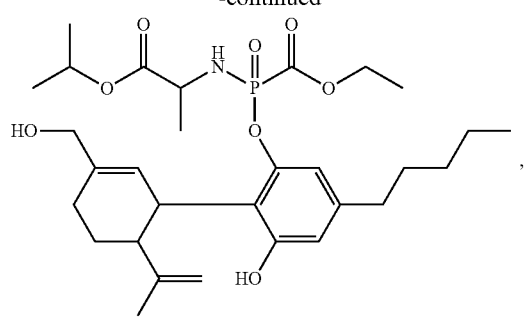
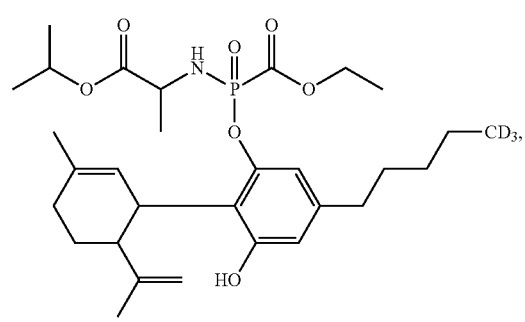
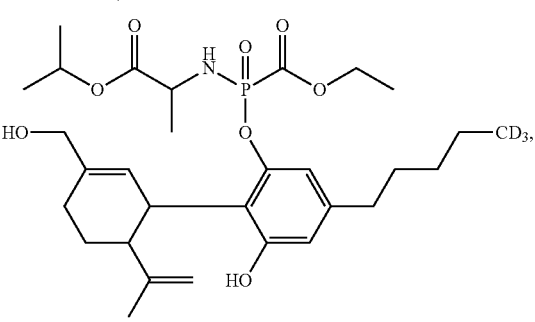
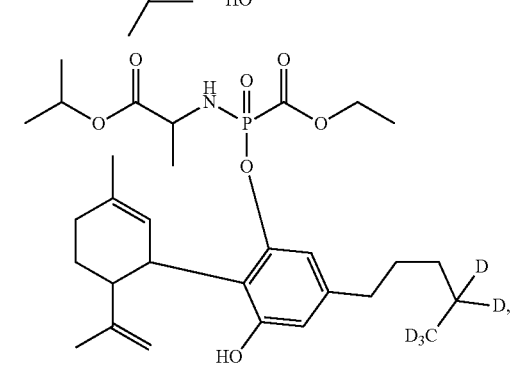
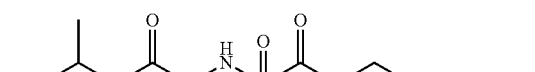
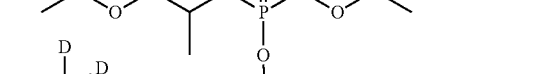
52
-continued
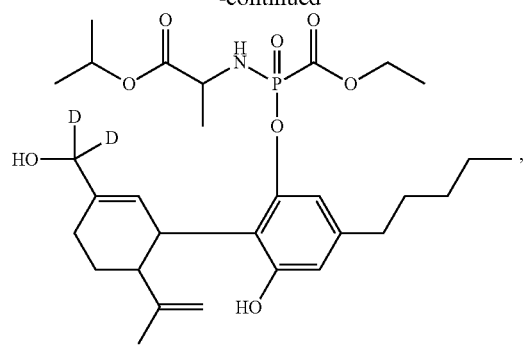
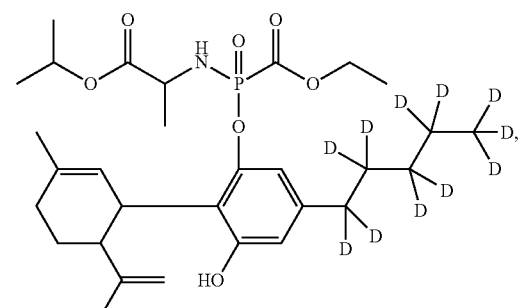
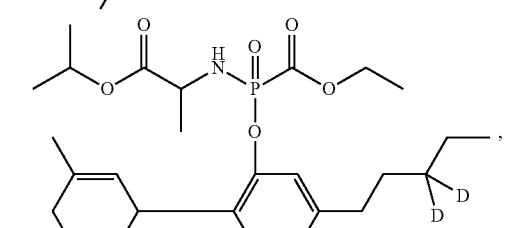
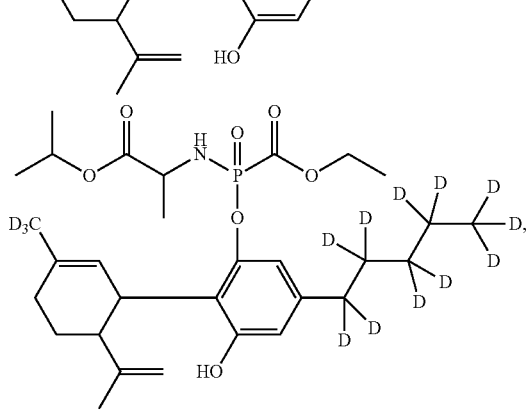
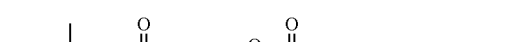
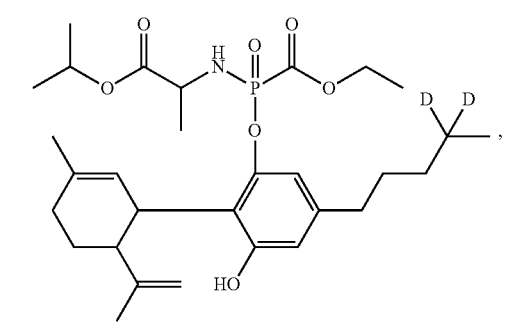

53
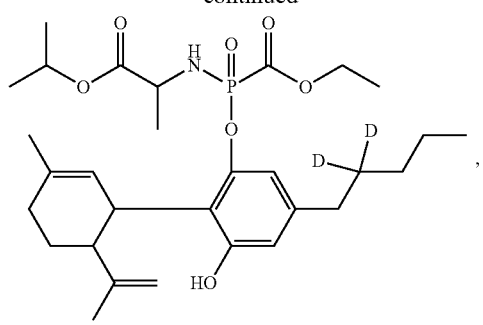
,
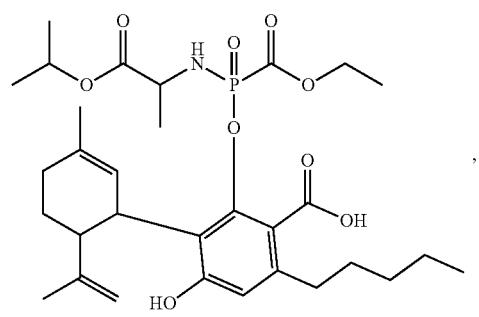
,
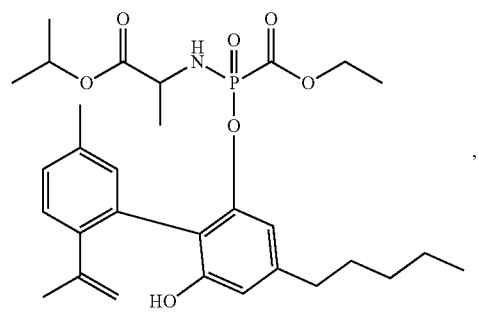
,
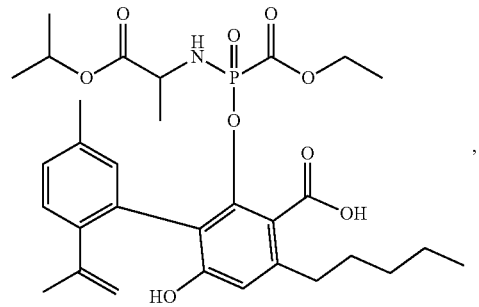
,
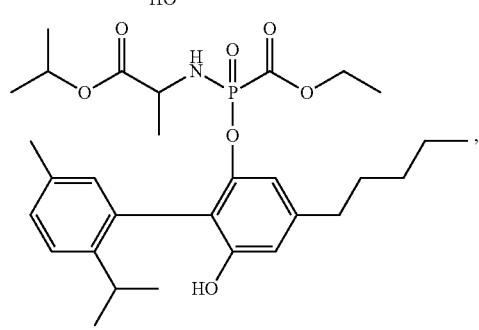
,
54
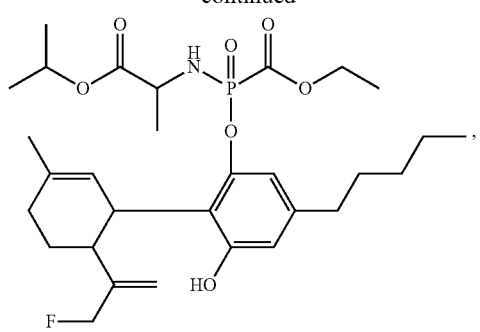
,
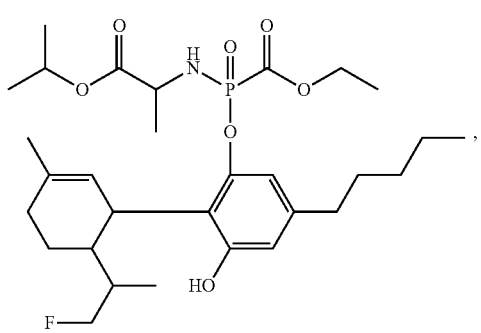
,
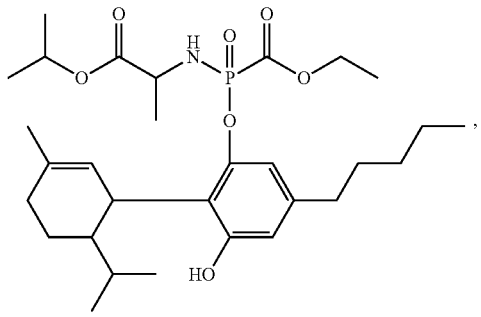
,
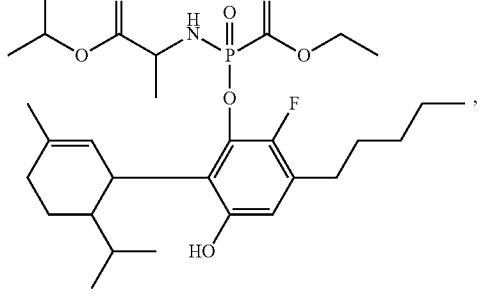
,
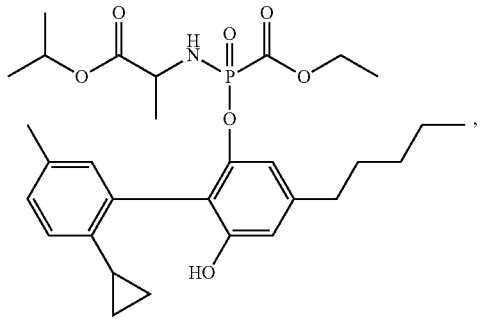
,

55

-continued

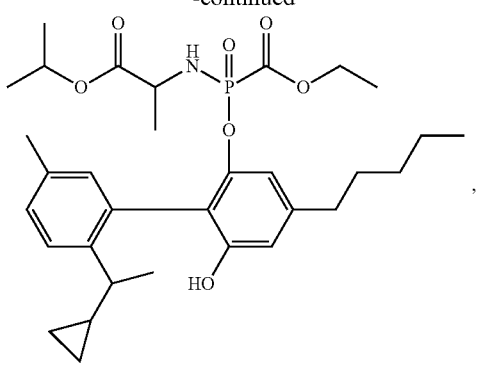

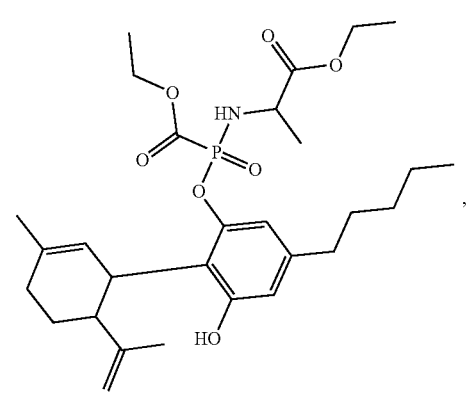

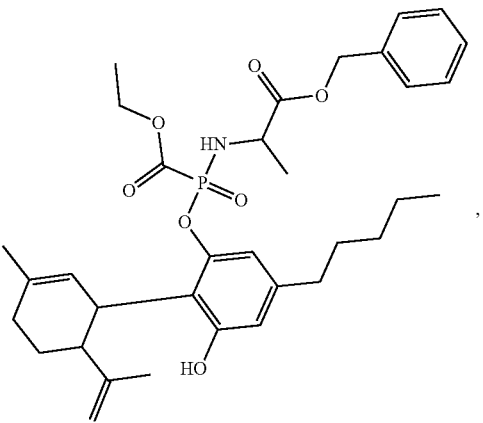

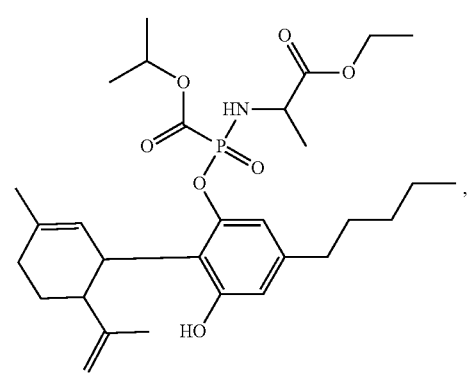

56

-continued

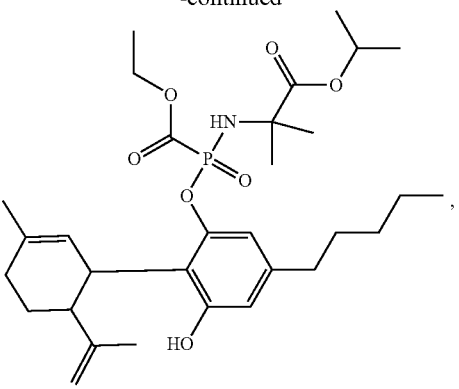

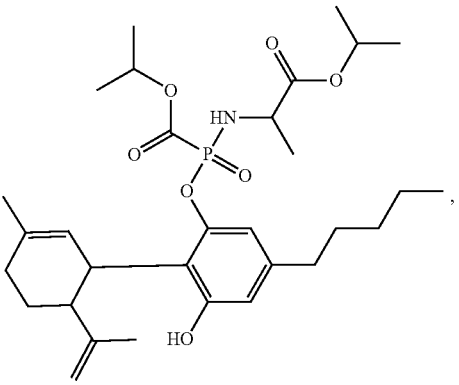

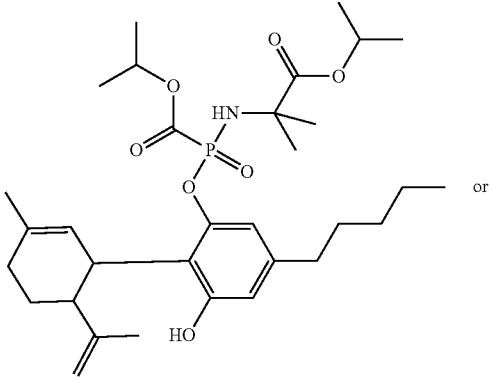

or

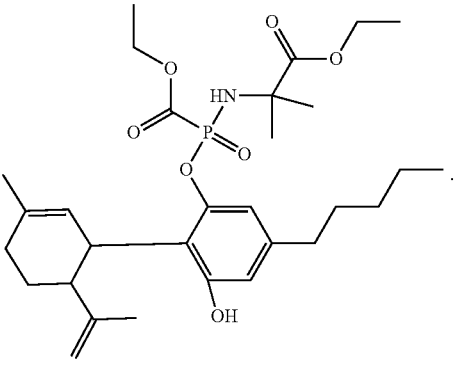

.

5. A pharmaceutical composition comprising:
(1) the compound, or stereoisomer, solvate, pharmaceutically acceptable salt or cocrystal thereof according to claim 4,
(2) optional one or more other active ingredients; and
(3) a pharmaceutically acceptable carrier and/or excipient.

6. The pharmaceutical composition according to claim 5, wherein, the other active ingredient is one or more selected from the group consisting of ginkgolide, antineoplastic agent, anticoagulant, antiepileptic agent, antidepressant, anxiolytic, hypnotic, analgesic and anesthetic, or stereoisomer, solvate, metabolite, pharmaceutically acceptable salt or cocrystal of the other active ingredient.

7. The pharmaceutical composition according to claim 6, wherein the ginkgolide is one, two or more selected from the group consisting of ginkgolide A, ginkgolide B, ginkgolide C, ginkgolide D, ginkgolide J, ginkgolide M, ginkgolide K, ginkgolide L, ginkgolide N, ginkgolide P, ginkgolide Q and bilobalide or combinations thereof in any ratio.

* * * * *